US009974066B2

(12) United States Patent
Novlan et al.

(10) Patent No.: US 9,974,066 B2
(45) Date of Patent: May 15, 2018

(54) METHODS AND APPARATUS FOR DEVICE-TO-DEVICE COMMUNICATIONS SYSTEM

(71) Applicant: Samsung Electronics Co., Ltd., Suwon-si, Gyeonggi-do (KR)

(72) Inventors: Thomas David Novlan, Dallas, TX (US); Boon Loong Ng, Dallas, TX (US); Young Han Nam, Plano, TX (US); Aris Papasakellariou, Houston, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 237 days.

(21) Appl. No.: 14/266,024

(22) Filed: Apr. 30, 2014

(65) Prior Publication Data
US 2014/0328329 A1 Nov. 6, 2014

Related U.S. Application Data

(60) Provisional application No. 61/818,336, filed on May 1, 2013, provisional application No. 61/842,278, filed
(Continued)

(51) Int. Cl.
*H04W 72/04* (2009.01)
*H04W 56/00* (2009.01)
(Continued)

(52) U.S. Cl.
CPC ....... *H04W 72/042* (2013.01); *H04W 56/002* (2013.01); *H04W 56/0015* (2013.01);
(Continued)

(58) Field of Classification Search
CPC ............ H04W 28/06; H04W 56/0015; H04W 56/002; H04W 72/0413; H04W 72/042; H04W 72/082; H04W 92/18
(Continued)

(56) References Cited

U.S. PATENT DOCUMENTS

2005/0111462 A1\* 5/2005 Walton ................ H04L 12/5693
370/395.4
2009/0001170 A1 1/2009 He
(Continued)

FOREIGN PATENT DOCUMENTS

CN 101388694 3/2009
CN 102090132 A 6/2011
(Continued)

OTHER PUBLICATIONS

Lee et al., "Timing Synchronization Method for Device-to-Device Communication System", Jan. 17-19, 2013, ACM, ICUIMC(IMCOM)'13, pp. all.\*
(Continued)

*Primary Examiner* — Un C Cho
*Assistant Examiner* — Shah Rahman

(57) ABSTRACT

A method includes configuring one or multiple pools of Device-to-Device (D2D) communication resources by an eNodeB (eNB). The method also includes signaling of the configured pool(s) of D2D communication resources by the eNB to a first User Equipment (UE) and a plurality of UEs using a common broadcast channel; and sending a request for one or multiple D2D communication resources to an eNB by the first UE configured to transmit D2D messages. The method also includes determining one or multiple resources for D2D communication by an eNB for the first UE. The method also includes communicating D2D resource allocation information to the first UE. The method also includes communicating D2D resource allocation information by the first UE to multiple UEs; and transmitting D2D data by the first UE to multiple UEs. Methods for configuring and signaling D2D communication resources by relay or out-of-coverage UEs are also provided.

25 Claims, 33 Drawing Sheets

Related U.S. Application Data on Jul. 2, 2013, provisional application No. 61/917,185, filed on Dec. 17, 2013, provisional application No. 61/968,886, filed on Mar. 21, 2014, provisional application No. 61/915,875, filed on Dec. 13, 2013, provisional application No. 61/835,376, filed on Jun. 14, 2013.

(51) Int. Cl.

| | |
|---|---|
| H04W 72/12 | (2009.01) |
| H04W 28/06 | (2009.01) |
| H04W 72/08 | (2009.01) |
| H04W 92/18 | (2009.01) |
| H04W 76/02 | (2009.01) |

(52) U.S. Cl.
CPC ........ *H04W 28/06* (2013.01); *H04W 72/0413* (2013.01); *H04W 72/082* (2013.01); *H04W 72/121* (2013.01); *H04W 76/023* (2013.01); *H04W 92/18* (2013.01)

(58) Field of Classification Search
USPC .................................................. 370/329, 336
See application file for complete search history.

(56) References Cited

U.S. PATENT DOCUMENTS

| | | | |
|---|---|---|---|
| 2009/0011770 A1 | 1/2009 | Jung et al. | |
| 2010/0093364 A1* | 4/2010 | Ribeiro | H04W 72/082 455/452.2 |
| 2011/0106952 A1 | 5/2011 | Doppler et al. | |
| 2011/0134827 A1 | 6/2011 | Hooli et al. | |
| 2011/0194485 A1 | 8/2011 | Horneman et al. | |
| 2011/0312331 A1* | 12/2011 | Hakola | H04W 72/085 455/452.2 |
| 2012/0093098 A1 | 4/2012 | Charbit et al. | |
| 2012/0106517 A1 | 5/2012 | Charbit et al. | |
| 2012/0129540 A1 | 5/2012 | Hakola et al. | |
| 2013/0039262 A1 | 2/2013 | Lim et al. | |
| 2013/0223356 A1* | 8/2013 | Khoshnevis | H04W 72/042 370/329 |
| 2013/0308552 A1* | 11/2013 | Madan | H04L 5/0094 370/329 |
| 2014/0003262 A1* | 1/2014 | He | H04W 28/08 370/252 |
| 2014/0023008 A1* | 1/2014 | Ahn | H04W 76/023 370/329 |
| 2014/0086152 A1* | 3/2014 | Bontu | H04L 1/1812 370/329 |
| 2014/0094183 A1* | 4/2014 | Gao | H04W 72/048 455/450 |
| 2014/0094212 A1* | 4/2014 | Ahn | H04W 48/16 455/517 |
| 2014/0226504 A1* | 8/2014 | Tavildar | H04W 72/082 370/252 |
| 2014/0241262 A1* | 8/2014 | Novak | H04W 72/042 370/329 |
| 2014/0355483 A1* | 12/2014 | Jang | H04W 8/26 370/254 |
| 2014/0369292 A1* | 12/2014 | Wu | H04W 72/04 370/329 |
| 2015/0016410 A1* | 1/2015 | Lee | H04L 1/18 370/330 |
| 2015/0071189 A1* | 3/2015 | Park | H04W 76/023 370/329 |
| 2015/0146687 A1* | 5/2015 | Kim | H04W 76/023 370/331 |
| 2015/0173088 A1* | 6/2015 | Kim | H04W 76/023 370/329 |
| 2015/0249937 A1* | 9/2015 | Lindoff | H04W 76/023 370/331 |

FOREIGN PATENT DOCUMENTS

| | | |
|---|---|---|
| CN | 102246575 A | 11/2011 |
| CN | 102334370 A | 1/2012 |
| WO | WO 2012/091420 A2 | 7/2012 |
| WO | 20120159270 A1 | 11/2012 |

OTHER PUBLICATIONS

ETSI et al., "ETSI TS 136 212 V10.1.0: LTE; Evolved Universal Terrestrial Radio Access (E-UTRA); Multiplexing and channel coding", 2011-04, ETSI, 3GPP TS 36.212 version 10.1.0 Release 10, pp. 55-56.*
International Search Report dated Aug. 21, 2014 in connection with International Patent Application No. PCT/KR2014/003899, 3 pages.
Written Opinion of International Searching Authority dated Aug. 21, 2014 in connection with International Patent Application No. PCT/KR2014/003899, 8 pages.
Foreign Communication from European Counterpart Application, European Application No. 14791591.2-1857, Extended European Search Report, dated Nov. 24, 2016, 9 pages.
Chinese Office Action for Chinese Application No. 201480024970.3, dated Dec. 5, 2017. (26 pages).

\* cited by examiner

FIGURE 32

| p | D2D Physical Broadcast Signal mapped on DMRS port 0 and 1 |

CRS AP 0-1     DMRS port 0 and 1

| | | 0 | 0 | 0 | | | 0 | 0 | 0 | 0 | 0 | | |
|---|---|---|---|---|---|---|---|---|---|---|---|---|---|
| | | 1 | 1 | 1 | 0 | 1 | 1 | 1 | 1 | 1 | 1 | 0 | 1 |
| | | 0 | 0 | 0 | 1 | 0 | 0 | 0 | 0 | 0 | 0 | 1 | 0 |
| | | 1 | 1 | 1 | 0 | 1 | 1 | 1 | 1 | 1 | 1 | 0 | 1 |
| | | 0 | 0 | 0 | 1 | 0 | 0 | 0 | 0 | 0 | 0 | 1 | 0 |
| | | 1 | 1 | 1 | | | 1 | 1 | 1 | 1 | 1 | | |
| | | 0 | 0 | 0 | 0 | 1 | 0 | 0 | 0 | 0 | 0 | 0 | 1 |
| | | 1 | 1 | 1 | 1 | 0 | 1 | 1 | 1 | 1 | 1 | 1 | 0 |
| | | 0 | 0 | 0 | 0 | 1 | 0 | 0 | 0 | 0 | 0 | 0 | 1 |
| | | 1 | 1 | 1 | 1 | 0 | 1 | 1 | 1 | 1 | 1 | 1 | 0 |
| | | 0 | 0 | 0 | | | 0 | 0 | 0 | 0 | 0 | | |
| | | 1 | 1 | 1 | 0 | 1 | 1 | 1 | 1 | 1 | 1 | 0 | 1 |

FIGURE 33

| p | D2D Physical Broadcast Signal mapped on DMRS port 0 and 1 |

DMRS port 0 and 1

| 0 | 0 | 0 | 0 | 0 |   |   | 0 | 0 | 0 | 0 | 0 |   |   |
|---|---|---|---|---|---|---|---|---|---|---|---|---|---|
| 1 | 1 | 1 | 1 | 1 | 0 | 1 | 1 | 1 | 1 | 1 | 1 | 0 | 1 |
| 0 | 0 | 0 | 0 | 0 | 1 | 0 | 0 | 0 | 0 | 0 | 0 | 1 | 0 |
| 1 | 1 | 1 | 1 | 1 | 0 | 1 | 1 | 1 | 1 | 1 | 1 | 0 | 1 |
| 0 | 0 | 0 | 0 | 0 | 1 | 0 | 0 | 0 | 0 | 0 | 0 | 1 | 0 |
| 1 | 1 | 1 | 1 | 1 |   |   | 1 | 1 | 1 | 1 | 1 |   |   |
| 0 | 0 | 0 | 0 | 0 | 0 | 1 | 0 | 0 | 0 | 0 | 0 | 0 | 1 |
| 1 | 1 | 1 | 1 | 1 | 1 | 0 | 1 | 1 | 1 | 1 | 1 | 1 | 0 |
| 0 | 0 | 0 | 0 | 0 | 0 | 1 | 0 | 0 | 0 | 0 | 0 | 0 | 1 |
| 1 | 1 | 1 | 1 | 1 | 1 | 0 | 1 | 1 | 1 | 1 | 1 | 1 | 0 |
| 0 | 0 | 0 | 0 | 0 |   |   | 0 | 0 | 0 | 0 | 0 |   |   |
| 1 | 1 | 1 | 1 | 1 | 0 | 1 | 1 | 1 | 1 | 1 | 1 | 0 | 1 |

METHODS AND APPARATUS FOR DEVICE-TO-DEVICE COMMUNICATIONS SYSTEM

CROSS-REFERENCE TO RELATED APPLICATION AND CLAIM OF PRIORITY

This application claims priority under 35 U.S.C. § 119(e) to U.S. Provisional Patent Application No. 61/818,336 filed on May 1, 2013 entitled "Method and Apparatus for Device-To-Device Broadcast", U.S. Provisional Patent Application No. 61/835,376 filed on Jun. 14, 2013 entitled "Method and Apparatus for Device-To-Device Broadcast", U.S. Provisional Patent Application No. 61/917,185 filed on Dec. 17, 2013 entitled "Method and Apparatus for Device-To-Device Broadcast", U.S. Provisional Patent Application No. 61/968,886 filed on Mar. 21, 2014 entitled "Method and Apparatus for Device-To-Device Broadcast", U.S. Provisional Patent Application No. 61/915,875 filed on Dec. 13, 2013 entitled "Device-To-Device Communications System Protocol" and U.S. Provisional Patent Application No. 61/842,278 filed on Jul. 2, 2013 entitled "Device-To-Device Communications System Protocol." The above-identified provisional patent applications are hereby incorporated by reference in their entirety.

TECHNICAL FIELD

This disclosure relates generally to wireless communication systems. More specifically, this disclosure relates to a protocol for device-to-device (D2D) communications.

BACKGROUND

Traditionally, cellular communication networks have been designed to establish wireless communication links between mobile devices and fixed communication infrastructure components (such as base stations or access points) that serve users in a wide or local geographic range. However, a wireless network can also be implemented utilizing only device-to-device (D2D) communication links without the need for fixed infrastructure components. This type of network is typically referred to as an "ad-hoc" network. A hybrid communication network can support devices that connect both to fixed infrastructure components and to other D2D-enabled devices.

D2D communication may be used to implement many kinds of services that are complementary to the primary communication network or provide new services based on the flexibility of the network topology. D2D multicast communication such as broadcasting or groupcasting is a potential means for D2D communication where mobile devices are able to transmit messages to all in-range D2D-enabled mobile devices or a subset of mobile devices which are members of particular group. Additionally networks may require devices to operate in near simultaneous fashion when switching between cellular and D2D communication modes. As a result, there is a need for protocols which can manage D2D communication in these hybrid deployment scenarios.

SUMMARY

This disclosure provides a protocol for device-to-device (D2D) communications.

In a first embodiment, a method is provided. The method includes configuring one or more pools of Device-to-Device (D2D) communication resources by an eNodeB (eNB). The method also includes signaling information regarding the one or more configured pools of D2D communication resources by the eNB to a first User Equipment (UE) and a plurality of UEs using a common broadcast channel. The method further includes receiving a request for one or multiple D2D communication resources by the eNB from the first UE, wherein the first UE is configured to transmit D2D messages. Additionally, the method includes determining one or multiple resources for D2D communication by the eNB for the first UE and communicating a D2D resource allocation information to the first UE. The first UE is configured to communicate the D2D resource allocation information to one or more of the plurality of UEs and transmit D2D data to one or more of the plurality of UEs.

In a second embodiment, a method is provided. The method includes configuring one or more pools of D2D communication resources by an enhanced Node B (eNB); and signaling, by the eNB, the configured one or more pools of D2D communication resources to a first user equipment (UE) and a plurality of UEs using a common broadcast channel.

In a third embodiment, a user equipment (UE) configured for D2D communication is provided. The UE includes processing circuitry configured to: receive configuration of one or more pools of D2D communication resources by an enhanced Node B (eNB) through a common broadcast channel; send a request for one or more D2D communication resources to the eNB; receive D2D resource allocation information from the eNB; communicate D2D resource allocation information to one or more UEs; and transmit D2D data to one or more UEs.

In a fourth embodiment, a user equipment (UE) configured for D2D communication is provided. The UE includes processing circuitry configured to: receive configuration of one or more pools of D2D communication resources by an enhanced Node B (eNB) through a common broadcast channel; choose from the D2D resource pools, one or more D2D resources for D2D transmissions; communicate D2D resource allocation information to one or more UEs; and transmit D2D data to one or more UEs.

In a fifth embodiment, an enhanced Node B (eNodeB) is provided. The eNodeB includes processing circuitry configured to: signal information regarding the configured one or more pools of D2D communication resources to a first User Equipment (UE) and a plurality of UEs using a common broadcast channel; signal information regarding the configured one or more pools of D2D communication resources to a first User Equipment (UE) and a plurality of UEs using a common broadcast channel; receive a request for one or more D2D communication resources by the first UE configured to transmit D2D messages; determine one or multiple resources for D2D communication for the first UE; and communicate D2D resource allocation information to the first UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that, in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 32 illustrates an example of DMRS antenna port association of resource elements assigned for D2D communications (DL subframe) according to this disclosure; and FIG. 33 illustrates an example of DMRS antenna port association of resource elements assigned for D2D transmission (UL subframe) according to this disclosure.

DETAILED DESCRIPTION

FIGS. 1 through 33, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

The following documents and standards descriptions are hereby incorporated into the present disclosure as if fully set forth herein: 3GPP Technical Specification No. 36.211, version 11.2.0 ("REF1"); 3GPP Technical Specification No. 36.212, version 11.2.0 ("REF2"); 3GPP Technical Specification No. 36.213, version 11.2.0 ("REF3"); 3GPP Technical Specification No. 36.214, version 11.1.0 ("REF4"); 3GPP Technical Specification No. 36.300, version 11.5.0 ("REF5"); 3GPP Technical Specification No. 36.321, version 11.2.0 ("REF6"); 3GPP Technical Specification No. 36.331, version 11.3.0 ("REF7"); and 3GPP Document No. RP-122009, "Study on LTE Device to Device Proximity Services" ("REF8").

Figure 1:
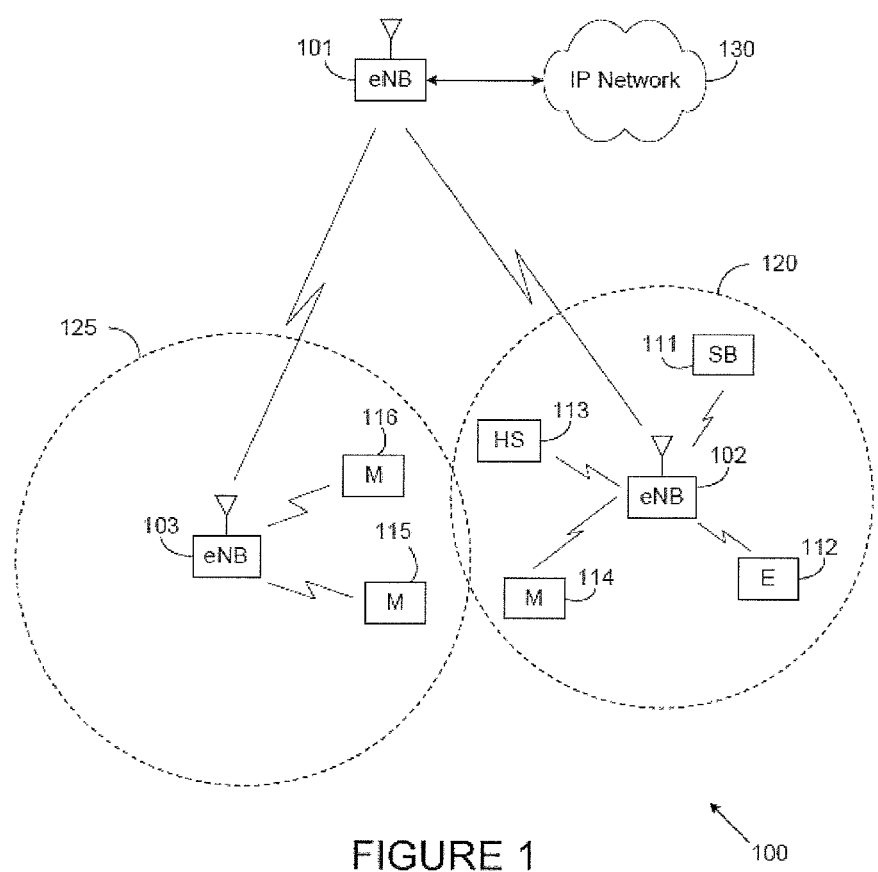
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known twits may be used instead of "eNodeB" or "eNB," such as "base station" or "access point." For the sake of convenience, the "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area of the eNB 102. The first plurality of UEs includes a UE 111, which may be located in a small business (SB); a UE 112, which may be located in an enterprise (E); a UE 113, which may be located in a WiFi hotspot (HS); and a UE 114, which may be a mobile device (M) like a cell phone, wireless laptop, wireless PDA, or the like. The eNB 103 provides wireless broadband access to the network 130 for a second plurality of UEs within a coverage area of the eNB 103. The second plurality of UEs includes a UE 115 and a UE 116, which may be mobile devices (M). In some embodiments, one or more of the eNBs 101-103 may communicate with each other and with the UEs 111-116 using 5G, LTE, LTE-A, WiMAX, or other advanced wireless communication techniques.

Various UEs 111-116 could also support device-to-device (D2D) communications in which the UEs communicate directly with one another. In this manner, the network 100 represents a hybrid communication network that allows a UE to connect both to a fixed infrastructure component (such as an eNB 101-103) and to other D2D-enabled UEs.

Dotted lines show the approximate extents of the coverage areas of two cells 120 and 125, which are shown as approximately circular for the purposes of illustration and explanation only. It should be clearly understood that the cells 120 and 125 associated with the eNBs 102-103 may have other shapes, including irregular shapes, depending upon the configuration of the eNBs and variations in the radio environment associated with natural and man-made obstructions.

As described in more detail below, components of the wireless network 100 (such as the eNBs 101-103 and the UEs 111-116) support a device-to-device communications protocol. Among other things, the device-to-device communications protocol allows UEs 111-116 to engage in D2D communications possibly in parallel with normal operations of the eNBs 101-103 and with devices connected to the eNBs 101-103.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
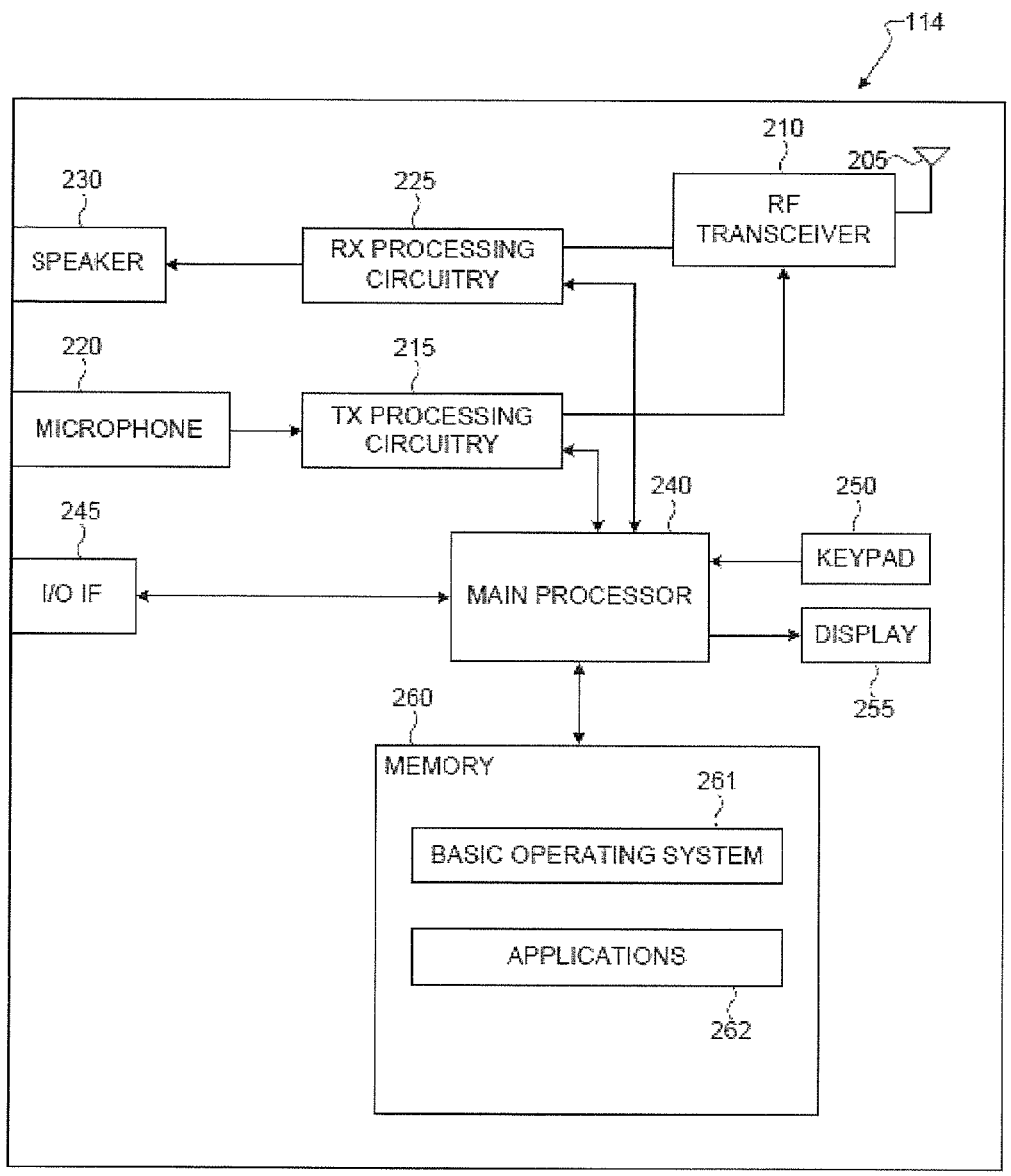
FIG. 2 illustrates an example user equipment (UE) according to this disclosure.

FIG. 2 illustrates an example UE 114 according to this disclosure. The embodiment of the UE 114 illustrated in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touchscreen.

The memory 260 is coupled to the main processor 240. Part of the memory 260 could include a random access memory (RAM), and another part of the memory 260 could include a Flash memory or other read-only memory (ROM).

As noted above, the UE 114 could operate in a hybrid communication network in which the UE 114 communicates with eNBs 101-103 and with other UEs. As described in more detail below, the UE 114 supports a device-to-device communications protocol that, with the assistance of the eNBs, allows the UE 114 to establish communication links with the neighboring UEs (even UEs in different cells).

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smartphone, UEs could be configured to operate as other types of mobile or stationary devices. In addition, various components in FIG. 2 could be replicated, such as when different RF components are used to communicate with the eNBs 101-103 and with other UEs.

Figure 3:
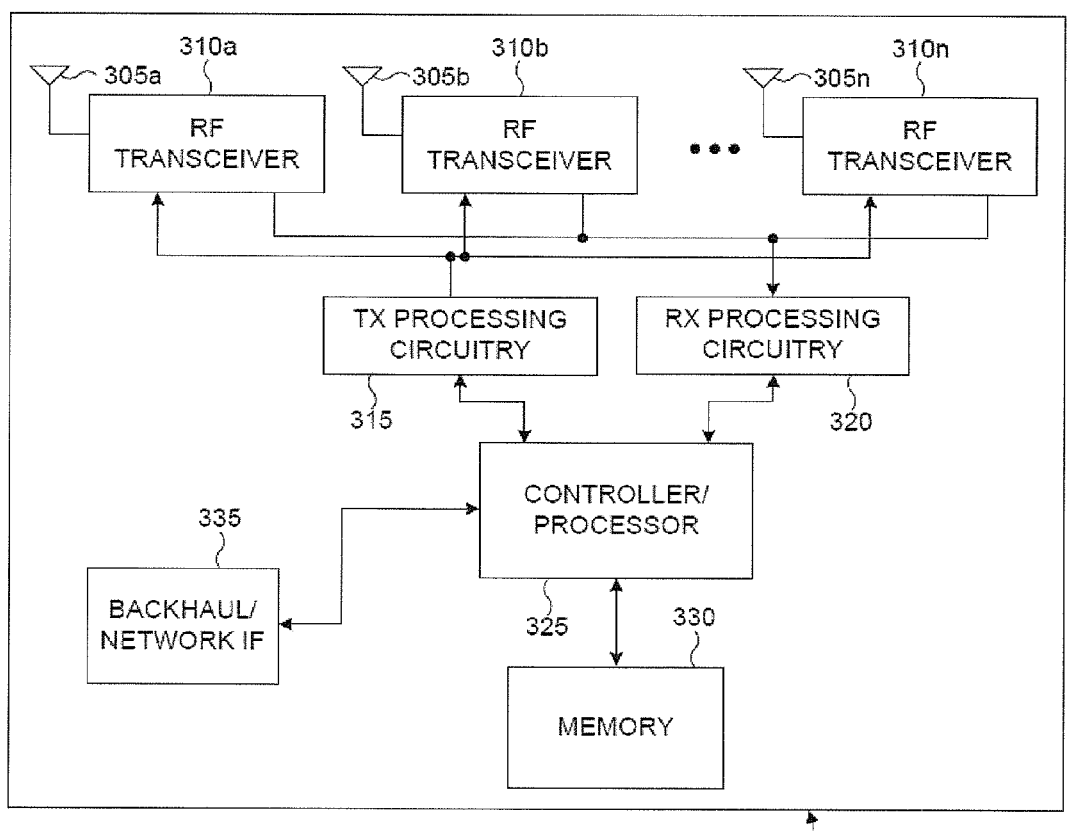
FIG. 3 illustrates an example eNodeB (eNB) according to this disclosure.

FIG. 3 illustrates an example eNB 102 according to this disclosure. The embodiment of the eNB 102 illustrated in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As noted above, the eNB 102 could operate in a hybrid communication network in which UEs communicate with the eNBs 101-103 and with other UEs. As described in more detail below, the eNB 102 supports a network-assisted multi-cell device discovery protocol that, with the assistance of the eNBs 101-103, allows the UEs to discover neighboring UEs and to establish communication links with the neighboring UEs (even UEs in different cells).

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver). Also, various components in FIG. 3 could be combined, further subdivided, or omitted and additional components could be added according to particular needs.

Figure 4:
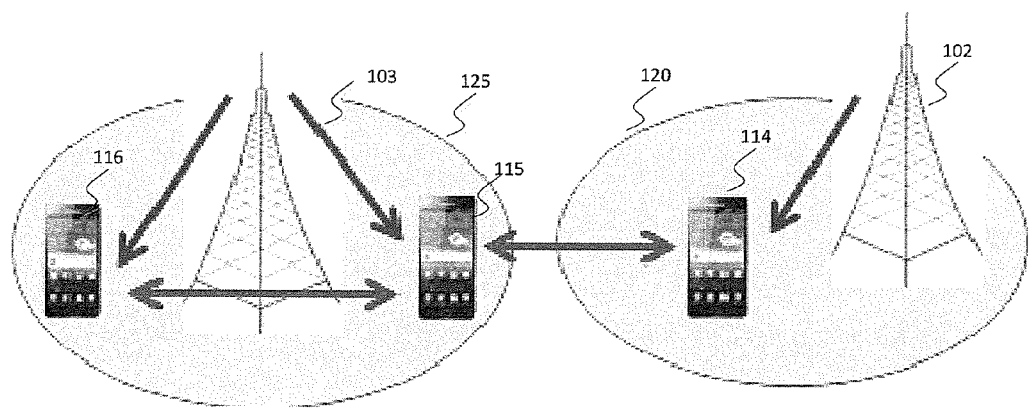
FIG. 4 illustrates example single-cell and multi-cell device-to-device (D2D) communications according to this disclosure.

FIG. 4 illustrates example in-network Device-To-Device (D2D) communications according to this disclosure. The embodiment of the in-network D2D communications shown in FIG. 4 is for illustration only. Other embodiments could be used without departing from the scope of the present disclosure.

In the single-cell example, the eNB 103 in the cell 125 communicates with multiple UEs 115-116. The UEs 115-116 can engage in wireless communications with the eNB 103, and the UEs 115-116 can also engage in D2D communications with each other.

In the multi-cell example, the eNB 102 in the cell 120 communicates with the UE 114. The UEs 114-115 can engage in wireless communications with their respective eNBs 102-103, and the UEs 114-115 can also engage in D2D communications with each other.

Various embodiments of the present disclosure illustrate a device-to-device communications protocol to support D2D communications between UEs in one or multiple cells. The device discovery protocol is referred to as "network-assisted" such that the eNBs associated with the cells can assist in the D2D communications process. In the following description, it may be assumed that the eNBs and UEs are operating in a hybrid LTE-Advanced cellular network, wherein the UEs have the ability to communicate with the network via UE-to-eNB links and with each other via UE-to-UE links. The network assists in the D2D communications process through an iterative protocol between the network and the respective UEs involving control messaging, D2D transmission and reception between the UEs, and feedback messaging on D2D operation. Additionally, the D2D communications protocol described here could be used in any other suitable network.

Figure 5:
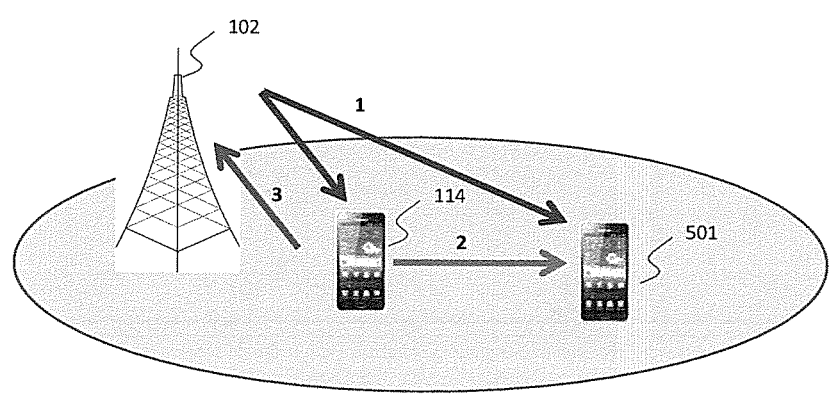
FIG. 5 illustrates a network-assisted in-network D2D communications protocol according to this disclosure.

FIG. 5 illustrates an example in-network device-to-device communications protocol according to this disclosure. The embodiment of the in-network D2D communications protocol shown in FIG. 5 is for illustration only. Other embodiments could be used without departing from the scope of the present disclosure.

In certain embodiments, in the network-assisted process, the UEs 114, 501 that are to engage in D2D communications are within the communication range of the network but are served by the same eNB 102. Note that while two UEs 114, 501 are shown in FIG. 5, the UEs 114, 501 could engage in D2D communications with other UEs in the same cells 120, 125 or in different cells. The following description can therefore be generalized to consider discovery between a plurality of UEs served by multiple eNBs.

Figure 6:
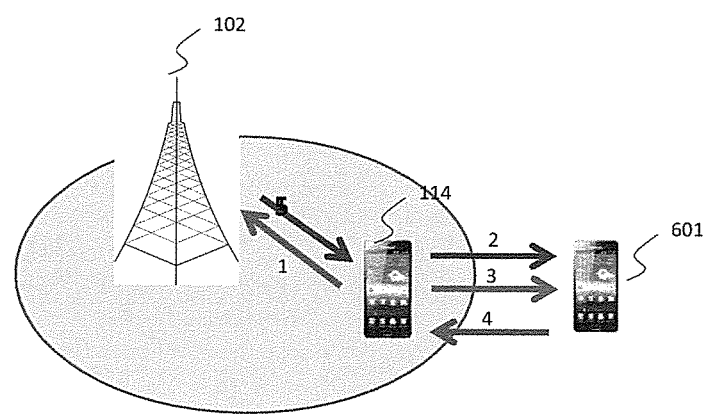
FIG. 6 illustrates a network-assisted partial coverage D2D communications protocol according to this disclosure.

FIG. 6 illustrates a network-assisted partial coverage D2D communications protocol according to this disclosure. The embodiment of the network-assisted partial coverage D2D communications protocol shown in FIG. 6 is for illustration only. Other embodiments could be used without departing from the scope of the present disclosure.

FIG. 6 considers the partial/relay operation wherein at least one of the devices to engage in D2D communication is within the communication range of the network, while at least one of the devices is not within coverage of the cellular network. In the example shown in FIG. 6, the network includes an eNB 102 and two D2D enabled UEs 114, 601: UE1 114 which is within the communication range of the eNB 102 and UE2 601 which is outside the coverage of the cellular network. Although only two UEs are considered, the following description could be generalized to consider discovery between a plurality of UEs.

The eNB 102 can configure an in-network UE to perform as a relay using a D2D transmission channel due to knowledge of out-of-network D2D-enabled UEs (for example in the case of a D2D discovery protocol) or due to the implementation of an emergency broadcast service which utilizes configured in-network UEs as coverage-extending relays.

Group leader determination could be based upon preconfiguration, for example one device in a police precinct. Alternatively, group leader determination could be based upon determination that no other group leaders are active within the vicinity of a UE or group of UEs. For example, a UE, such as UE 114, during the course of synchronization procedure, as previously described, can determine that neither network-based nor D2D UE-based sync signal is received. After determining that neither network-based nor D2D UE-based sync signal is received, the UE 114 can determine to initiate group-leader operation and transmit D2D sync and/or D2D SIB.

Figure 7:
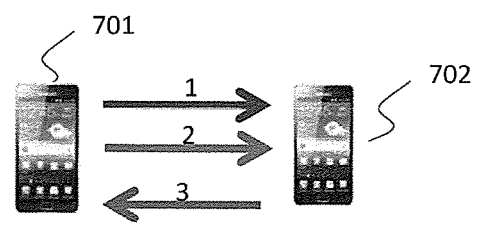
FIG. 7 illustrates an out-of-network D2D communications protocol according to this disclosure.

FIG. 7 illustrates an out-of-network D2D communications protocol according to this disclosure. The embodiment of the out-of-network D2D communications protocol shown in FIG. 7 is for illustration only. Other embodiments could be used without departing from the scope of the present disclosure.

FIG. 7 considers the operation wherein all of the devices to engage in D2D communication are not within coverage of the cellular network. In this scenario, coordinated operation of the D2D protocol is desired in order to efficiently allocate resources and avoid potential interference issues. One method to implement coordinated operation of the D2D protocol is through the operation of one of the OOC UEs 701-702 taking on much of the coordination and signaling provided by the eNB 102 in the case of full or partial network operation as illustrated in FIG. 5 and FIG. 6. All or multiple UEs 701-702 can be capable of operation as a group leader. Although only two UEs are illustrated, the following description could be generalized to consider discovery between a plurality of UEs.

The protocol for multi-cell network-assisted device discovery is divided into three main steps as shown in FIG. 5:
(1) authorization and configuration;
(2) D2D transmission/reception;
(3) feedback and reconfiguration;
Steps (1) and (3) occur between the UEs 114, 501 and the serving the eNB 102. Step (2) occurs between the UEs 114, 501.

The D2D communications protocol for partial coverage operation is divided into one or more of the following 4 phases as shown in FIG. 6:
(1) relay request and configuration;
(2) Sync signal transmission and D2D SIB broadcast;
(3) D2D control channel and data transmission and reception
(4) D2D report messaging if optionally configured.

The D2D communications protocol for out-of-coverage operation is divided into one or more of the following 3 phases as shown in FIG. 7:
(1) Sync signal transmission and D2D SIB broadcast;
(2) D2D control channel transmission and reception;
(3) D2D data channel transmission and reception;
A detailed description of each step in the protocols are provided below.

D2D Transmission Authorization

In step (1) of FIG. 5, a UE 114 capable of D2D communications should first be authorized to utilize the appropriate resources for transmission and reception. The network can employ a dedicated D2D server to perform the authorization functions and store relevant information regarding D2D communication related parameters and metrics. The request for authorization can be initiated by a UE 114 upon a higher layer application trigger, or could be initiated by the network.

In the case of an UE initiated authorization request, the UE 114, after initial access to the network, can send a D2D Communications Authorization (DCA) message via an uplink control channel message to indicate to the network a request to be authorized for D2D transmission/reception. The DCA message can indicate a priority for D2D communication relative to other traffic types, as well as a request for authorization of particular D2D communication modes.

Table 1 gives an example of a DCA message with fields for configuring whether the UE is requesting authorization for D2D transmission, reception, or both, as well as optional fields indicating priority and D2D Groupcast IDs for membership authorization.

TABLE 1

| Field | Description |
| --- | --- |
| D2D Comm. Authorization Type | |
| {00, 10, 01, 11} | 00- D2D Comm. Disabled<br>01 - D2D Comm. Rx Enabled<br>10 - D2D Comm. Tx Enabled<br>11 - D2D Comm. Rx/Tx Enabled |

TABLE 1-continued

| Field | Description |
| --- | --- |
| Priority (optional) | |
| {0, 1} | Indicates low or high priority for D2D communication |
| Group ID (optional) | |
| 4 10-bit IDs | Indicates up to 4 groups for the UE to associate with |

In response to receiving a DCA message, the eNB 102 can forward the UE 114 information to a higher-layer entity such as a D2D server which proceeds to validate and confirm UE authorization for D2D resources and provides a response to the eNB 102. This is followed by a DCA response (DCAR) message, which is a confirmation/configuration message from the eNB 102 to the UE 114 and provides any additional parameters necessary for the UE 114 to engage in the configured D2D communication modes. Another information function of the DCAR is to indicate to the UE 114 the resources utilized by the D2D communication channels for which the UE 114 has been authorized. Details of the resource indication are given later, but may consist of a configuration for the UE 114 to monitor a system information broadcast (SIB) message.

Table 2 gives an example of a DCAR with fields for configuring whether the UE 114 is requesting authorization for D2D transmission, reception, or both, as well as optional fields indicating priority and D2D Groupcast IDs for membership authorization.

TABLE 2

| Field | Description |
| --- | --- |
| D2D Comm. Authorization Type | |
| {00, 10, 01, 11} | 00- D2D Comm. Disabled<br>01 - D2D Comm. Rx Enabled<br>10 - D2D Comm. Tx Enabled<br>11 - D2D Comm. Rx/Tx Enabled |
| Priority (optional) | |
| {0, 1} | Indicates low or high priority for D2D communication |
| Group ID (optional) | |
| 4 10-bit IDs | Indicates up to 4 groups for the UE to associate with |
| D2D Resource Indication (optional) | |
| Frame Offset, Subframe Offset, Subframe Period | Indicates frequency, periodicity of D2D SIB |

In one alternative, the DCAR is provided via higher-layer signaling, such as a Radio Resource Control (RRC) message and configuration procedure. In the case of network-initiated D2D-BGC, the DCAR can be provided by the eNB 102 directly to a UE 114 without first receiving a DCA message from the UE 114.

D2D Control Channel

A D2D communication channel can correspond to a given group, resource pool, or broadcast ID. As part of Step (1) of the D2D communications protocol given in FIG. 5, in order for D2D transmissions to be received a D2D transmission control channel (DCCH) is needed to be transmitted in addition to the reference symbols (RS) and data symbols.

This control information can be separated from unicast cellular control information since the control information is only relevant for UEs participating in D2D communication.

In certain embodiments, the D2D control information for a given group or broadcast ID employs a unique DCCH. The group/broadcast IDs can be pre-configured, indicated by higher-layer configuration, or provided in a system information broadcast message. UEs can be capable of being configured to monitor or receive from multiple DCCHs.

In another alternative, the D2D control information for multiple group or broadcast IDs can be mapped to the same DCCH.

A limited amount of DCCH information can be provided via system information broadcast. This primarily concerns the information needed to acquire the DCCH(s). For example, this information can be carried by means of a single D2D specific SystemInformationBlock: SystemInformationBlockTypeX.

In certain embodiments, a D2D communication channel is identified solely by the d2d-ChannelId values contained in D2D-ChannelList in SystemInformationBlockTypeX. At mobility, the UE 114 considers that the D2D channel is continuous and the UE 114 can maintain service continuity of the D2D communication when the source cell and the target cell broadcast the same value in the D2D-ChannelList.

D2D System Information Broadcast

As mentioned previously, in certain embodiments, the control information necessary for acquiring the D2D control channels is provided on the BCCH. This information is carried by means of a single D2D specific SystemInformationBlock: SystemInformationBlockTypeX. For convenience this SystemInformationBlockTypeX is referred to hereafter as the D2D-SIB. This is advantageous because the D2D-SIB, for example, allows UEs in IDLE or CONNECTED mode to transmit and receive D2D direct transmissions.

The information carried by the D2D-SIB can include at least one of the following:
1. D2D-ChannelList including one or more d2d-ChannelIds
2. For each D2D transmission channel identity (d2d-ChannelId):
   The DL or UL subframe configuration (subframe periodicity and subframe offset);
   A set of physical resource blocks (number of PRBs and its location within the system bandwidth)
   Other alternatives for a D2D transmission channel can be a set of Orthogonal Frequency-Division Multiplexing (OFDM) symbols of D2D subframes or a set of resource blocks of D2D subframes.
   D2D RS port configuration (port index, D2D RS scrambling identity).

Alternatively, a subset of the above parameters can be provided for all general D2D communication and discovery operations and information specific to acquire DCCH can be provided by pre-configuration, higher-layer configuration, or direct transmission from transmitting UEs. Some examples of control information that is transmitted in D2D-SIB and in DCCH are given below in Table 3.

TABLE 3

| Example | D2D-SIB | DCCH |
|---|---|---|
| 1 | List of available D2D channels | Modulation and coding schemes |

TABLE 3-continued

| Example | D2D-SIB | DCCH |
|---|---|---|
|  | Time & frequency resources (PRBs & subframes) assigned for each DCCH<br>Time & frequency resources (PRBs & subframes) assigned for each D2D channel<br>Tx Power (for D2D tx UE)<br>D2D id (e.g. used for DMRS scrambling)<br>. . . | (MCS) for a D2D channel<br>Actual time & frequency resources (PRBs & subframes) assigned for a D2D channel<br>DMRS info (cyclic shift and OCC index)<br>. . . |
| 2 | List of available D2D channels<br>Time & frequency resources (PRBs & subframes) assigned for each DCCH<br>Time & frequency resources (PRBs & subframes) assigned for all D2D channels<br>Tx Power (for D2D tx UE)<br>D2D id (e.g. used for DMRS scrambling)<br>. . .<br>Note: time & frequency resource for the D2D communication channel associated with a DCCH can be predefined based on the total resources available. | MCS for a D2D channel<br>Actual time & frequency resources (PRBs & subframes) assigned for a D2D channel<br>DMRS info (cyclic shift and OCC index)<br>. . . |
| 3 | List of available D2D channels<br>Time & frequency resources (PRBs & subframes) assigned for each DCCH<br>Tx Power (for D2D tx UE)<br>D2D id (e.g. used for DMRS scrambling)<br>. . .<br>Note: time & frequency resource for the D2D communication channel associated with a DCCH can be predefined. | MCS for a D2D channel<br>Actual time & frequency resources (PRBs & subframes) assigned for a D2D channel<br>DMRS info (cyclic shift and OCC index)<br>. . . |

The following example provides a configuration of the IE D2D-ChannelList, which contains the information required to acquire the DCCH control information associated with one or more D2D Group/Broadcast channel IDs.

D2D-ChannelList information element

```
-- ASN1START
D2D-ChannelList ::=            SEQUENCE (SIZE(1..maxD2D-
ChannelInfo)) OF D2D-ChannelInfo
D2D-ChannelInfo ::=            SEQUENCE {
    d2d-ChannelId              INTEGER (0..1024),
    notificationIndicator      INTEGER (0..7),
        dcch-Config            SEQUENCE {
        dcch-RepetitionPeriod, ENUMERATED {rf32,
rf64, rf128, rf256},
        dcch-Offset            INTEGER (0..10),
        dcch-ModificationPeriod ENUMERATED {rf512,
rf1024},
    sf-AllocInfo               BIT STRING (SIZE(6)),
        rb-AllocInfo           BIT STRING
(SIZE(6)),
        d2d-ScramblingId       INTEGER
(0..1024),
    },
        d2d-TxPowerLevel       INTEGER
(0..7),
    ...
}
-- ASN1STOP
```

The parameter, d2d-ChannelId, provides a unique identifier for a given D2D transmission channel (set of time/frequency resources). The d2d-ChannelId additionally can be 1-1 mapped to a ID such as a logical channel ID. It is up to network implementation whether multiple logical IDs can map to the same set or subsets of physical channel resources.

The parameter, notificationIndicator, can be used by the network to inform UEs about whether any of the information for a given D2D channel/DCCH have been changed since the previous modification period.

As described previously multiple parameters can be configured for successful reception of the DCCH at the UE by dcch-Config. These parameters can include indication of the number of radio frames between DCCH transmission (dcch-RepetitionPeriod), which together with the dcch-Offset, gives the exact radio frames in which DCCH is scheduled i.e. DCCH is scheduled in radio frames for which: SFN mod dcch-RepetitionPeriod=dcch-Offset. The parameter dcch-ModificationPeriod defines periodically appearing boundaries, i.e., radio frames for which SFN mod dcch-ModificationPeriod=0. The configuration of different transmissions of DCCH information can only be different if there is at least one such boundary in-between them.

In step (2) of FIG. 5, a D2D discovery protocol between two UEs (such as UEs 114, 501) is initiated. Several approaches are described below, including approaches in which the D2D discovery protocol is network-initiated and other approaches where the discovery protocol is UE-initiated.

The time/frequency resources for the D2D channel/DCCH can be directly indicated as part of the configuration parameters (e.g. bitmap corresponding to D2D resource blocks (DRBs) and D2D resource slots (DRSs)) in rb-AllocInfo and sf-AllocInfo.

Finally if d2d-ChannelId is not provided or is used for logical channel identification only, the parameter d2d-ScramblingId can be indicated to inform the UE 114 about the appropriate scrambling to apply to the DCCH and possibly the DSCH DM-RS.

In one alternative, there can be multiple lists of D2D channels. For example:
A first D2D channel list can include channels available for contention among D2D UE transmitters. A second D2D channel list can include channels available for contention-free resource reservation by D2D UE transmitters.
Different D2D channel list can correspond to D2D channels with different amount of time and frequency resources.

The UE configured for D2D broadcast/groupcast operation can follow the following procedure:
1> if the UE 114 is interested and configured to receive D2D broadcast/groupcast:
2> if schedulingInfoList in SystemInformationBlock-Type1 indicates that SystemInformationBlockTypeX is present and the UE 114 does not have stored a valid version of this system information block:
3> acquire SystemInformationBlockTypeX;

In one alternative, the D2D broadcast/groupcast parameters conveyed in the D2D SIBs are coordinated between different neighboring eNBs. This is necessary so that D2D transmissions do not occur during different subframes such that inter-cell interference can impact D2D operation in one cell and normal cellular communication in the other. Also, coordinating parameters allows devices in neighboring cells to participate in D2D operations by providing a common set of channels/parameters. The information exchange can take place over an eNB-eNB interface such as the X2 or S1 interfaces used in LTE.

For example, the time/frequency resources utilized for a given D2D channel can be divided into N D2D transmission resource blocks (DTRBs) transmitted in T dedicated D2D transmission resource slots (DTRS).

Figure 8:
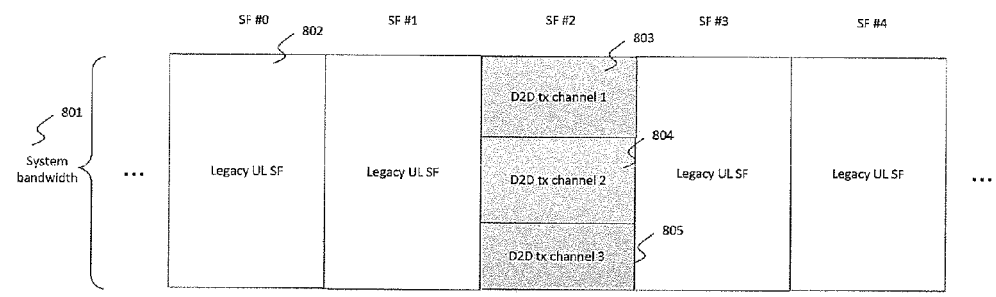
FIG. 8 gives an example of configured UL resources for multiple D2D transmission channels according to this disclosure.

FIG. 8 gives an example of configured UL resources for multiple D2D transmission channels according to this disclosure. The embodiment of the UL resources shown in FIG. 8 is for illustration only. Other embodiments could be used without departing from the scope of the present disclosure.

In one example, a DTRB corresponds to a PRB pair and a DTRS corresponds to a subframe in REF1. FIG. 8 provides an example system bandwidth 801 comprising configured UL resources 802 for multiple D2D transmission channels 803-805.

The information exchange can be performed by utilizing a D2D Transmission Configuration Message (DTCM), which includes at least one of the following parameters:
1. D2D broadcast/groupcast subframe indices and period
2. D2D broadcast/groupcast channel time/frequency resource mapping
3. D2D channels IDs/ID range An example format of the DTCM is given in Table 4.

TABLE 4

| Field | Description |
| --- | --- |
| Broadcast Subframe Indices and Period | |
| 0-9, 0-10000 | Indicates starting subframe (n), and period (relative to n) of D2D subframes |
| DRB/DRS map | |
| bitmap A bitmap B | 1 or 0 indicates whether or not the corresponding DTRB or DTRS is utilized for D2D broadcast/groupcast |
| ID allocation | |
| 8 Integers (range: 0-1023) | Indicates currently configured group/broadcast IDs for given D2D channels |

D2D Transmission Reconfiguration and D2D SIB Change Indication

In certain embodiments, the change of DCCH information only occurs at specific radio frames, i.e., the concept of a modification period can be used. Within a modification period, the same DCCH information can be transmitted a number of times, as defined by its scheduling (which is based on a repetition period). The modification period boundaries are defined by system frame number (SFN) values for which SFN mod m=0, where m is the number of radio frames comprising the modification period. The modification period is configured by means of SystemInformationBlockTypeX.

To minimize the overall control overhead, the DCCH information should remain valid for a predetermined period, termed a modification period, with changes occurring at specific instances (e.g., the D2D SIB is the same for X radio frames). When the network changes any of the information for the DCCH, the network will first notify the UEs about the change during the modification period prior to the one in which the network will transmit the updated DCCH information.

Figure 9:
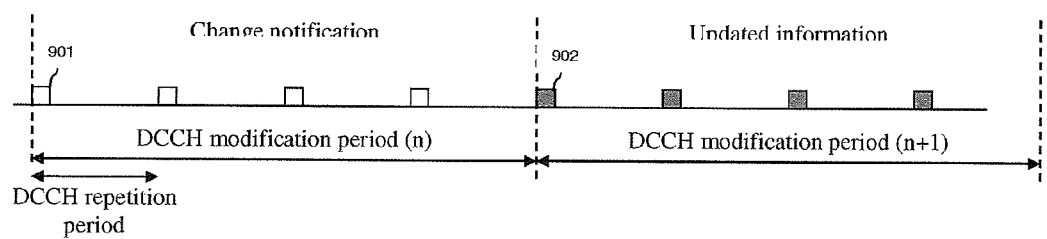
FIG. 9 illustrates the DCCH information change process within the D2D SIB according to this disclosure.

FIG. 9 illustrates the DCCH information change process within the D2D SIB according to this disclosure. The DCCH information change process shown in FIG. 9 is for illustration only. Other embodiments could be used without departing from the scope of the present disclosure.

FIG. 9 illustrates the information change process with two colors representing different DCCH information 901-902 within the D2D SIB. Upon receiving a change notification, a UE interested to receive D2D communication of a given channel acquires the new DCCH information immediately from the start of the next modification period. The UE applies the previously acquired DCCH information 901 until the UE acquires the new DCCH information 902.

In one alternative, a D2D specific identifier is transmitted by the eNB, such as eNB 102, via a paging mechanism (e.g. PDCCH) to inform UEs, such as UE 114 and UE 501, in RRC_IDLE and UEs in RRC_CONNECTED about a change in the D2D SIB. In one alternative the D2D specific identifier corresponds to different D2D broadcast/groupcast channel IDs. When receiving D2D SIB change notification, the UE 114 knows that the DCCH information for at least one channel will change at the next modification period boundary. The notification identifier indicates which of the DCCHs will change. In one alternative, notification is done by means of a bitmap whose size is given by the max number of DCCH, which are configured by the network. Within this bitmap, the bit at the position indicated by the field notificationIndicator is used to indicate changes for that D2D channel: if the bit is set to "1", the corresponding DCCH will change. These D2D SIB notification occasions can be common for all DCCHs that are configured, and configurable by parameters included in SystemInformationBlockTypeX, including a repetition coefficient, a radio frame offset and a subframe index. In one alternative, these common notification occasions are based on the DCCH with the shortest modification period.

The Paging message is used to inform UEs in RRC_IDLE and UEs in RRC_CONNECTED about a system information change. If the UE 114 receives a Paging message including the d2dInfoModification, UE 114 knows that the system information regarding at least one DCCH will change at the next modification period boundary. If no paging message is received by the UE 114 during a modification period, the UE 114 can assume that no change of D2D related system information will occur at the next modification period boundary.

In one alternative, the Paging message also can include an indication of a high or low priority change in the D2D SIB. This is beneficial in the case that one or more broadcast or groupcast IDs are related to emergency message services. UEs that are configured for D2D, but that are not actively monitoring the DCCHs of interest, can receive a high priority D2D SIB notification in the paging to inform them to decode the updated D2D SIB and attempt to receive the related message. However a low priority message can indicate to the UEs only interest in critical communications that not acquiring the updated D2D SIB will not impact their ability to receive such services.

In one alternative D2D capable UEs in RRC_CONNECTED shall attempt to read paging at least once every defaultPagingCycle to check whether a high priority D2D broadcast/groupcast change notification is present or not.

D2D Communication Interest Signaling

Many factors at the network and UE sides may influence the decision of whether a given UE participates in direct transmission and reception. Additionally, especially in the case of broadcast operation in which the transmitting UE may not be aware of which UEs are receiving the transmissions, the network can collect information from the UEs regarding interest and relative priority for participating in D2D communication.

In this embodiment, the UE 114 can be optionally configured to transmit a D2DTransmissionInterestIndication (DTII) message after acquiring the D2D SIB on a periodic or aperiodic basis.

Figure 10:
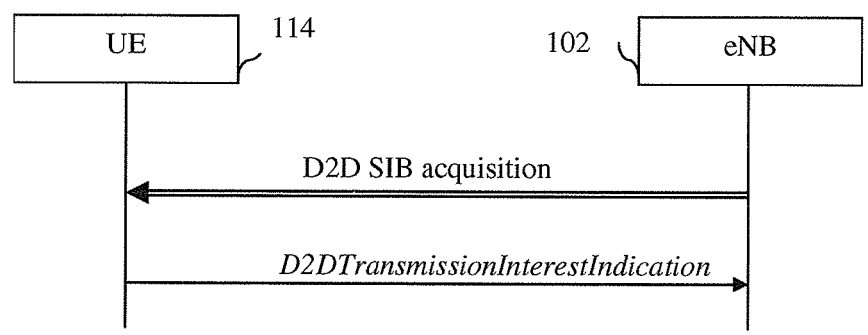
FIG. 10 illustrates the signaling flow for D2D interest indication according to this disclosure.

The information contained in the D2DTransmissionInterestIndication can include at least one of the following information fields:

1. D2D Channel ID List
2. D2D Priority Indication
3. D2D Reception Failure Indication
4. D2D Channel Measurement Report In one alternative, the UE 114 sets the contents of the D2DTransmissionInterestIndication message as follows:

1> For a given D2D channel of interest:
2> include d2d-ChannelID in d2d-ChannelList
2> include d2d-ChannelID in d2d-PriorityIndication if the UE prioritises reception of the indicated D2D channel above reception of any of the unicast bearers;
2> include d2d-ChannelID in d2d-ReceptionFailureIndication if the fails to receive DCCH and/or data transmission for the indicated channel after a predefined number of attempts;
2> include d2d-ChannelID in d2d-ChannelMeasurementReport if the UE is configured to measure channel quality for the indicated channel using a configured metric such as RSRP;

An exemplary signaling flow is provided in FIG. 10.

FIG. 10 illustrates the signaling flow for D2D interest indication according to this disclosure. While the signaling flow depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The process depicted in the example depicted is implemented by a transmitter chains in, for example, a mobile station and a base station.

It is noted that the above procedure may be modified depending on which feedback fields a UE is configured as part of D2D operation. For example, both d2d-ReceptionFailureIndication and d2d-ChannelMeasurementReport may not be simultaneously configured as part of the interest indication message to reduce the overhead of the messages.

The periodicity of the DTII reports and transmission timing can be configurable by the eNB 102. For example, the eNB 102 may only wish to configure the UEs to transmit interest indication messages with priority indications after D2D SIB modification periods, however D2D channel measurement reports can be configured on a periodic basis while the D2D UE is receiving a given DCCH and related data transmissions from another UE.

In another alternative, the eNB 102 can forward some or all of the contents of received DTII reports to the UEs transmitting the related D2D channels via a DTTI relay message. This can be beneficial for the transmitting UEs to adapt the transmission parameters and scheduling depending on the type of feedback. The eNB 102 can configure the transmitting UEs to receive the relay reports on an aperiodic or periodic basis using higher layer control messages.

D2D Control Channel

Figure 11:
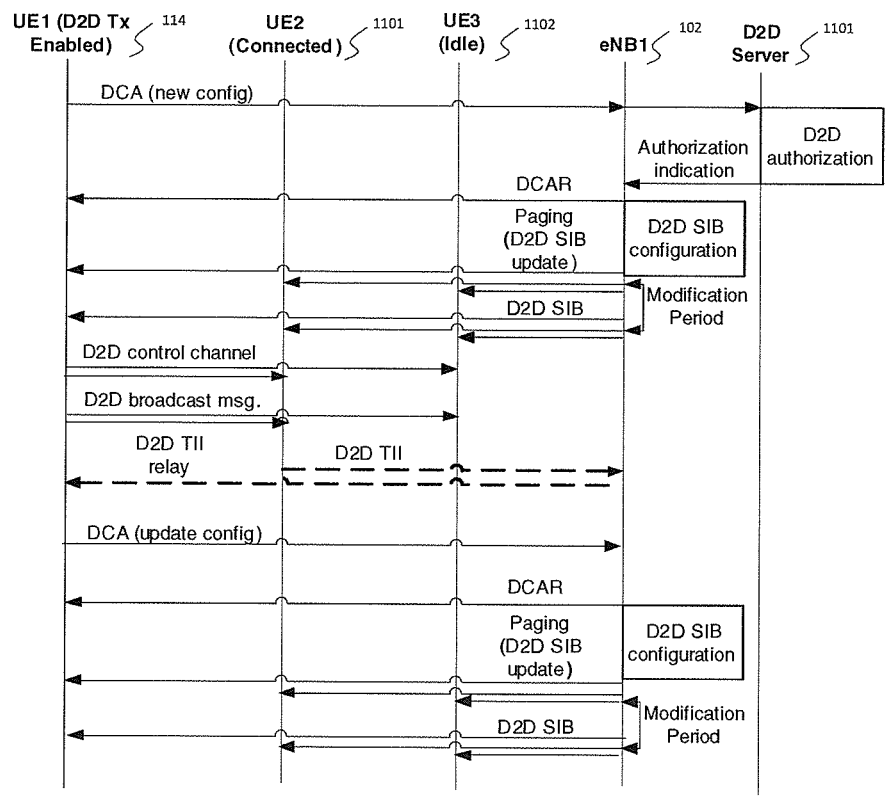
FIG. 11 illustrates an exemplary protocol flow for an in-network D2D communication protocol according to this disclosure.

FIG. 11 below gives an exemplary protocol flow for in-network D2D communication protocol as given in FIG. 5. While the signaling flow depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The process depicted in the example depicted is implemented by a transmitter or receiver chains in, for example, a server, a mobile station and a base station.

A UE 114 interested in transmitting on a D2D channel requests authorization from the eNB 102. Upon receiving the initial configuration from the eNB 102 the transmitting UE 114 waits for the D2D SIB update notification (via paging). Following the modification period, the updated D2D SIB is transmitted by the eNB 102, and all D2D configured UEs will be able to receive the configured DCCHs.

Once the updated D2D SIB is decoded, or alternately higher layer configuration indicates for the UE 114 to initiate transmission, the D2D transmitting UE 114 will send the DCCH followed by the D2D data and RS according to Step (2) of FIG. 5.

If configured, the receiving UEs 114 and 501 can provide feedback notifications in a D2D TII, and the reports may be relayed to the transmitting UEs via the eNB 102 according to Step (3) of FIG. 5. If the transmitting UE 114 wishes to use an updated configuration (add or remove a group ID, request additional time/frequency resources, MCS change etc.), the UE 114 first sends a DCA and waits for the DCAR and modification period followed by the updated D2D SIB before utilizing the updated configuration.

Figure 12:
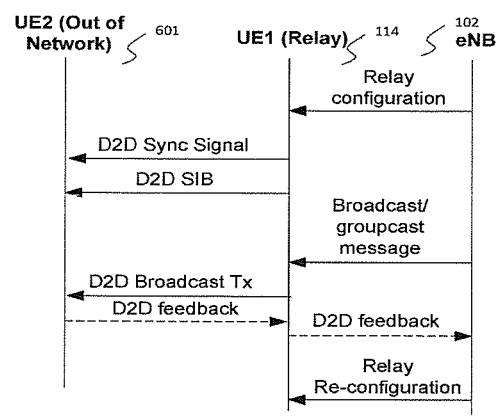
FIG. 12 illustrates an exemplary protocol flow for a partial network coverage D2D communication protocol according to this disclosure.

FIG. 12 illustrates an exemplary protocol flow for a partial network coverage D2D communication protocol according to this disclosure. While the signaling flow depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The process depicted in the example depicted is implemented by a transmitter or receiver chains in, for example, a mobile station and a base station.

An exemplary D2D communications protocol signal flow in the case of partial network coverage scenario of FIG. 6 is provided in FIG. 12. The transmission by the relay UE 601 can utilize the same DCCH/data timing/multiplexing as any of the previously mentioned methods for in the in-network operation. Note that D2D feedback from the out-of-coverage UE 602 is optionally indicated.

Figure 13:
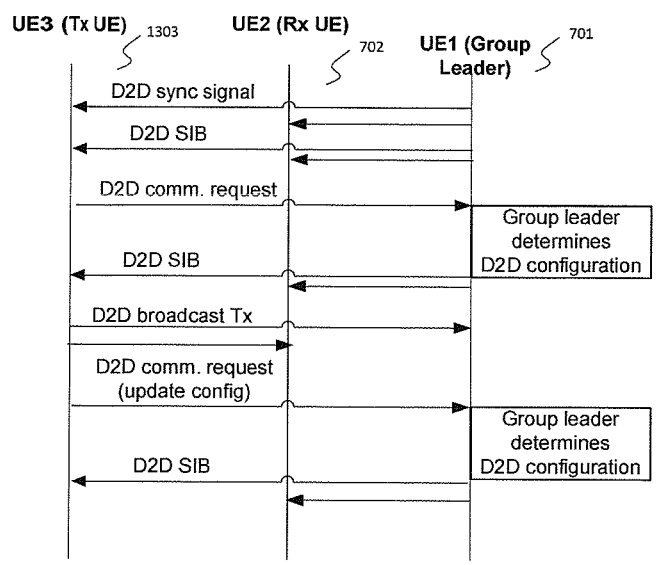
FIG. 13 illustrates an exemplary D2D communications protocol flow for out-of-coverage UEs according to this disclosure.

FIG. 13 illustrates an exemplary D2D communications protocol flow for out-of-coverage UEs according to this disclosure. While the signaling flow depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The process depicted in the example depicted is implemented by a transmitter or receiver chain in, for example, a mobile station.

In the example shown in FIG. 13, a group leader UE 701 and two other D2D enabled UEs 702, 1303 are outside the coverage of the cellular network as shown in FIG. 7. Although only one group leader and two UEs are considered, the following description could be generalized to consider communication between a plurality of UEs. The signaling provided in FIG. 13 may be the same or based upon the corresponding messages as provided in the previous two protocols in FIG. 11 and FIG. 12 with a subset of parameters preconfigured instead of dynamically indicated. This is beneficial to reduce the signaling overhead, protocol complexity and resource utilization for the out-of-coverage UEs. Although not directly indicated in the protocol, feedback mechanisms may also be configured for the OOC UEs by the group leader.

Relay Configuration

In one alternative, a UE may be configured to act as a relay according to the partial coverage scenario of FIG. 6, with parameters given by a higher-layer signaling message such as a D2D relay configuration message (RCM). The RCM can include at least one of the following fields:

Relay configuration index

Transmit power

Relay or Group ID

D2D SIB transmission information:
    Total number of DTRBs (N)
    Total number of DTRSs (T)
    DTRB/DTRS maps Sync Signal Indication

VCID

Sync Signal Configuration Index

In one alternative, the parameters related for configuring relay operation are provided in a DCAR and the format of a RCM may closely correspond to a DCAR with additional fields. These fields can indicate, for example, the transmission of a sync signal, D2D SIB, and/or DCCH transmission using a configured relay ID.

The format of the RCM alternatively can be constructed from a subset of the above parameters and include explicit indication of multiple parameters such as time/frequency resource allocation, transmit power, and sync signal IDs, or can indicate a configuration index corresponding to a reconfigured set of parameters.

In one alternative, the RCM can convey an indication for the UE to transmit a D2D sync signal and/or D2D SIB and a corresponding parameter configuration, where the D2D SIB is first directly acquired by the relay UE from the normal D2D SIB transmission instants. In another alternative the parameters for the D2D SIB are provided in the RCM or another higher layer configuration message.

An example of a configured RCM is given in Table 4:

TABLE 4

| Field | Description |
|---|---|
| Relay configuration index | |
| 0 | Indicates low priority operation |
| 1 | Indicates high priority operation |
| Transmit Power | |
| 0-3 | Indicates Tx Pwr Config. to use for relay operation |

TABLE 4-continued

| Field | Description |
| --- | --- |
| Discovery IDs (optional - for Alt 1 targeted discovery) | |
| Up to 8 8-bit values | Indicate 8 unique IDs (out of 256 possible) |
| DTRB/DTRS maps | |
| bitmap A | 0 or 1 indicates whether or not the |
| bitmap B | corresponding DTRB or DTRS is utilized for DCCH or D2D SIB transmission |
| Sync Signal Indication | |
| 0 or 1 | Indicates if UE transmitted sync signal is configured (0-off, 1-on) |
| VCID (optional) | |
| 0-503 | Indicates the virtual cell ID to generate the synchronization signal |
| Sync Signal Configuration Index (optional) | |
| 0-3 | Indicates time/frequency/power parameters/sync signal sequence ID to use as part of relay operation |

D2D Synchronization

In the case of FIG. 6 and FIG. 7, where at least one of the devices is outside of the coverage of the network, timing synchronization must first be ensured so that the control and discovery signaling can be properly transmitted and received by in-coverage (IC) and out-of-coverage (OOC) devices. For example, if UE2 is outside of network coverage and the eNB signals to UE1 to engage in relay transmission, UE2 would need to know both when UE1 is transmitting its D2D SIB and when UE1 would be transmitting the DCCH, RS and data symbols. This requires at a minimum that UE2 knows the OFDM symbol timing (CP length), subframe boundary, and subframe indexes as well as propagation delay between UE1 and UE2 to properly configure timing advance parameters. Since the network is not initially aware of the OOC devices and further, even if aware, may not be able to communicate with the OOC devices, the protocol must allow the IC UE to manage the setup of synchronization between the IC and OOC devices and relay relevant control messages from UE2 to the eNB.

Several alternatives for achieving timing synchronization between UE1 and UE2 are considered below:

Alt. 1) UE1 transmits a periodic synchronous signal (denoted as D2D sync signal) based upon the primary synchronization signals and secondary synchronization signals (PSS/SSS) transmitted by the eNB.

For example, the D2D sync signal can be identical to the signal transmitted by the eNB, except for the time and/or frequency location. For an FDD system, the PSS and SSS are transmitted in the central six resource blocks of the uplink bandwidth during subframes 0 and 5 instead of the downlink bandwidth.

It is noted that a virtual cell ID can be configured for the PSS/SSS, in which case the virtual cell ID replaces the physical cell ID for generating the D2D PSS/SSS sequences.

Alt. 2) UE1 transmits a compact periodic synchronous signal, which has a short duration and long periodicity and may cover the entire uplink or downlink bandwidth.

D2D Relay Protocol

Figure 14:
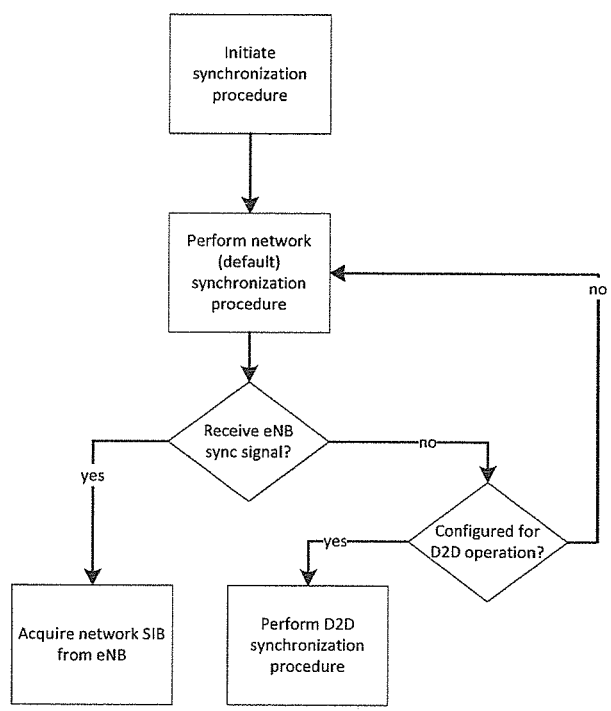
FIG. 14 illustrates an exemplary synchronization procedure for a D2D UE according to this disclosure.

FIG. 14 illustrates an exemplary synchronization procedure for a D2D UE according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

After relay configuration, the in-network UE relay should transmit the D2D sync signal and D2D SIB according to the transmission parameters and scheduling as configured by the network (by RCM for example) or by preconfiguration. The out-of-network UE2, when it is configured for D2D operation and detects that it is not currently under network coverage, will first search to receive the D2D sync signal, followed by the D2D SIB.

In one alternative, the out-of-network UE determines to search for a D2D sync signal and D2D control channel information after first attempting to acquire sync and system information from a transmitting eNB. If the synchronization/system information acquisition fails according to a predetermined metric (such as radio link failure) or timer, then the OOC device will initiate the procedure to acquire the D2D sync signal and system information.

In another alternative the OOC device can receive a D2D sync or SIB including a relay-specific ID. Upon receiving the relay ID, the UE abandons attempts to acquire network synchronization/system information (additional timers also can be used in conjunction to make this determination). The UE can start an OOC timer, during which the UE will not attempt to perform network synchronization until the timer expiration.

After relay configuration, the eNB can provide the broadcast/groupcast message for UE1 to relay. In one alternative, the broadcast/groupcast message can be conveyed by the eNB as part of a higher-layer signaling message. In another alternative, the message can be provided in a downlink unicast data channel or multicast channel (e.g. MBMS). For example an eNB can transmit an emergency broadcast mechanism that is received by the in-network UEs configured to relay coverage for OOC UEs. The in-network UEs can decode the broadcast message and are additionally indicated by the eNB (e.g. via RCM or as part of a PDCCH message) to relay the message on a configured D2D broadcast/groupcast channel.

Contention-Free D2D Resource Reservation

In step (2) of FIG. 5, depending upon the certain D2D communication operation, D2D transmission channels are contended for among D2D UE transmitters. Before a D2D UE transmitter is allowed to transmit on a D2D channel, channel sensing is typically performed by the UE to ensure that a D2D channel is not currently occupied by another D2D UE transmitter. Nevertheless, there is a finite chance that two or more D2D UE transmitters may transmit on the same D2D channels and incur interference to each other.

Depending upon the application of D2D communication, a certain D2D communication may have higher importance over another, e.g. D2D communication that is used for emergency message broadcast may be considered to have the highest priority. Therefore it is beneficial to provide contention free D2D channels for such D2D UE transmitters to ensure high reliability of the D2D service.

To enable a D2D communication with higher Quality of Service (QoS), the network's D2D resources can be divided into contention free region and contention region. A D2D UE transmitter is required to request for resource reservation from the network if it wants to transmit D2D signals in the contention-free region.

Contention free resource reservation can be done using a random access procedure. Random access procedure is used in LTE for purposes such as initial access, UL synchronization and scheduling request. There is a need for the network to identify the reason of UE's initiation of random access procedure for D2D resource request.

Figure 15:
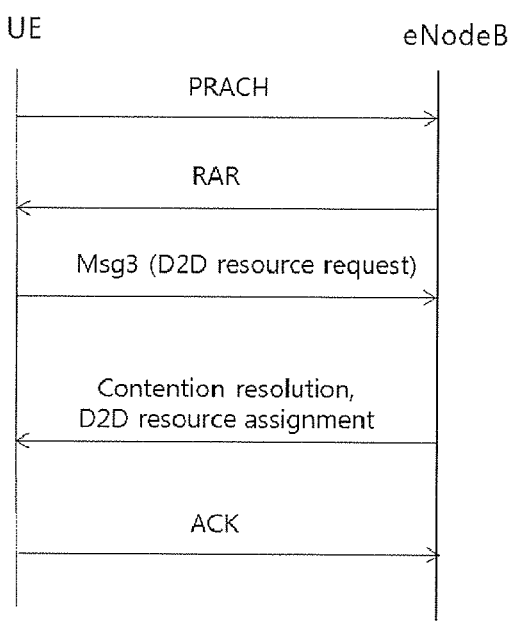
FIG. 15 illustrates an exemplary flow chart for an in-network coverage D2D resource reservation procedure within the RACH procedure according to this disclosure.
Figure 16:
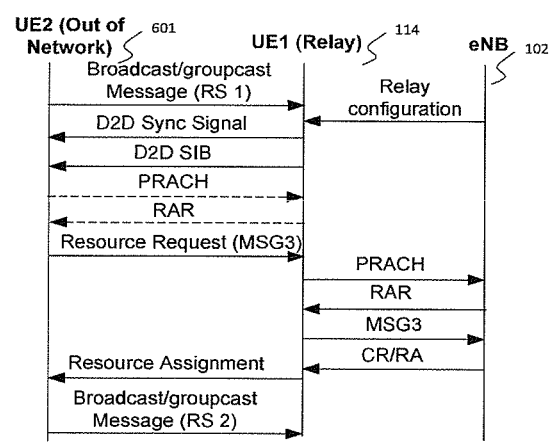
FIG. 16 illustrates an exemplary flow chart for a partial network coverage D2D resource reservation procedure within the RACH procedure according to this disclosure.

Some examples of the random access are provided below and flow charts are shown in FIG. 15 and FIG. 16.

FIG. 15 illustrates an exemplary flow chart for a D2D resource reservation procedure within the RACH procedure according to this disclosure. While the signaling flow depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The process depicted in the example depicted is implemented by a transmitter or receiver chains in, for example, a mobile station and a base station.

FIG. 16 illustrates an exemplary flow chart for a partial network coverage D2D resource reservation procedure within the RACH procedure according to this disclosure. While the signaling flow depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The process depicted in the example depicted is implemented by a transmitter or receiver chains in, for example, a mobile station and a base station.

Example 1

Step 1: UE Sends a Random Access Preamble
  Preamble and Physical Random Access CHannel (PRACH) resource can be selected from the set of preambles and PRACH resources according to configuration in SIB2 for contention based random access procedure.
  To support contention-free random access procedure, the eNB can assign a dedicated preamble for the UE beforehand and the UE uses the dedicated preamble to initiate the random access procedure.
Step 2: eNB detects preamble request and sends a Random Access Response (RAR) with UL grant for Msg 3
  The timing advance command in RAR can be used to indicate the timing advance with respect to the DL serving cell signal to be assumed by the UE for D2D signal transmission.
Step 3: After detection of RAR at the UE, the UE sends a Message 3 (Msg3) containing the reason for the random access initiation, i.e. request for D2D contention-free resource as well as other information related to the request.
  In one method, the request for D2D contention-free resource is indicated using a spare value in the EstablishmentCause IE within the RRC connection request IE (SEE REF7), e.g. as shown below:

```
EstablishmentCause ::=     ENUMERATED {
                           emergency, highPriorityAccess, mt-
  Access, mo-Signalling,
                           mo-Data, delayTolerant..Access-v1020,
  d2dResourceRequest, spare1}
```

In one alternative of this method, priority of the request can be indicated using the two spare values in the EstablishmentCause IE within the RRC connection request IE (SEE REF7), e.g. as shown below, where d2dResourceRequestPriority1 and d2dResourceRequestPriority2 indicates a high priority request and a low priority request, respectively:

```
EstablishmentCause : =     ENUMERATED {
                           emergency, highPriorityAccess, mt-
  Access, mo-Signalling,
                           mo-Data, delayTolerantAccess-v1020,
  d2dResourceRequestPriority1,
  d2dResourceRequestPriority2}
```

In another method, the request for D2D contention-free resource is indicated using a spare value in the RRCConnectionRequest-r8-IEs, e.g. as shown below:

```
RRCConnectionRequest-r8-IEs ::=    SEQUENCE {
ue-Identity                        InitialUE-Identity,
establishmentCause                 EstablishmentCause,
d2dResourceRequest                 ENUMERATED {
contentionFreeResourceRequest, spare}
}
```

In one alternative of this method, priority of the request can also be indicated using a spare value in the RRCConnectionRequest-r8-IEs, e.g., as shown below, where d2dResourceRequestPriority1 and d2dResourceRequestPriority2 indicates a high priority request and a low priority request, respectively:

```
RRCConnectionRequest-r8-IEs::=     SEQUENCE {
ue-Identity                        InitialUE-Identity,
establishmentCause                 EstablishmentCause,
d2dResourceRequest                 ENUMERATED {
d2dResourceRequestPriority1, d2dResourceRequestPriority2}
}
```

In another method, the request for D2D contention-free resource can be indicated using a Medium Access Control (MAC) control element. A Logical Channel ID (LCID) value can be reserved for D2D resource request as shown in Table 5.

TABLE 5

| Index | LCID values |
|---|---|
| 00000 | CCCH |
| 00001-01010 | Identity of the logical channel |
| 01011-10111 | Reserved |
| 11000 | D2D resource request |
| 11001 | Extended Power Headroom Report |
| 11010 | Power Headroom Report |
| 11011 | C-RNTI |
| 11100 | Truncated BSR |
| 11101 | Short BSR |

TABLE 5-continued

| Index | LCID values |
|---|---|
| 11110 | Long BSR |
| 11111 | Padding |

Figure 17A:
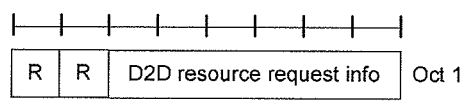
FIGS. 17A, 17B and 17C illustrate various exemplary MAC control element formats for carrying D2D resource request and resource assignment control signaling contents according to this disclosure.

The MAC control element for D2D resource request can contain the priority of request, the amount of resources required and the required length of resource reservation period. In one example, the request can be indicated by a set of indices, one index for one information field which is predefined or preconfigured. In the examples in Tables 6a-6c, 6 bits of information can be used to indicate the priority (2 bits), the time-frequency resource set required (2 bits) as well as the resource reservation period (2 bits). In this example, one byte MAC control element can be used to convey the control information as shown in FIG. 17A.

TABLE 6a

| Index | Priority |
|---|---|
| 00 | 1 |
| 01 | 2 |
| 10 | 3 |
| 11 | 4 |

TABLE 6b

| Index | Resource Set |
|---|---|
| 00 | $1^{st}$ resource set |
| 01 | $2^{nd}$ resource set |
| 10 | $3^{rd}$ resource set |
| 11 | $4^{th}$ resource set |

TABLE 6c

| Index | Resource reservation period |
|---|---|
| 00 | $1^{st}$ period |
| 01 | $2^{nd}$ period |
| 10 | $3^{rd}$ period |
| 11 | $4^{th}$ period |

In another alternative, the indices for priority, resource set request, and reservation period request can be combined to jointly indicate parameters. This is advantageous in the case that not all exhaustive combinations of parameters are supported by the network or UEs. Table 7 gives an example index mapping to a joint parameter configuration.

TABLE 7

| Index | Resource reservation period |
|---|---|
| 000 | $1^{st}$ priority; $1^{st}$ RS; $1^{st}$ RP |
| 001 | $1^{st}$ priority; $1^{st}$ RS; $2^{nd}$ RP |
| 010 | $1^{st}$ priority; $2^{nd}$ RS; $3^{rd}$ RP |
| 011 | $1^{st}$ priority; $2^{nd}$ RS; $4^{th}$ RP |
| 100 | $2^{nd}$ priority; $1^{st}$ RS; $1^{st}$ RP |
| 101 | $2^{nd}$ priority; $1^{st}$ RS; $2^{nd}$ RP |
| 110 | $2^{nd}$ priority; $2^{nd}$ RS; $3^{rd}$ RP |
| 111 | $2^{nd}$ priority; $2^{nd}$ RS; $4^{th}$ RP |

Step 4: After detection of Msg3 sent by the UE, the eNB sends a contention-free D2D resource assignment to the UE (HARQ retransmission is supported to improve reception reliability at the UE), which is represented by a set of time-frequency resources.

Assuming there is a set of time-frequency resource associated with a D2D channel id, the indication of time-frequency resource can be simply done by indication of the D2D channel id assigned. The time-frequency resource can also be signaled using other resource allocation signaling methods.

In addition, a length of resource reservation period can be indicated. Upon the expiration of the reservation period, the UE no longer transmits D2D signals using the assigned resources.

Furthermore, a resource reservation id can also be signaled. The resource reservation id can be used by the UE for resource reservation extension request (see Example 4).

The eNB also can reject UE's request in Step4, in which case, the UE attempts to perform random access again after a random backoff. The backoff parameter can be signaled in a SIB.

Note that for contention based random access procedure, the conventional contention resolution mechanism can be used.

Example 2

Step 1: UE sends a random access preamble using PRACH resource reserved for D2D contention free request Examples of PRACH resource reserved for D2D contention free request includes dedicated preamble for D2D, dedicated time/freq PRACH resource for D2D)

Alternatively, the random access preamble or the PRACH resource can be used to implicitly indicate specific control information between sets of potential D2D resources. For example, preamble A can be used to indicate a set of resource blocks for a given number of subframes appropriate for transmitting a VoIP packet, while preamble B indicates a different set of resource blocks and subframes for a UE requesting to transmit a video packet. Different preambles also can be utilized to indicate UE priority with regards to accessing the transmission medium (e.g. emergency call vs. normal traffic).

The configuration of PRACH resource reserved for D2D contention free request can be signaled in a SIB.

Note that contention can occur if multiple D2D UEs select the same PRACH resource for transmission.

Step 2: eNB detects the D2D preamble/PRACH and sends a RAR with UL grant for Msg 3

The timing advance command in RAR can be used to indicate the timing advance with respect to the DL serving cell signal to be assumed by the UE for D2D signal transmission.

Step 3: After detection of RAR, the UE sends a Msg3

The D2D Msg3 can be a new RRC message containing the detailed D2D resource request, such as the priority of request, the amount of resources required and the required length of resource reservation period. Due to the dedicated PRACH resource for D2D in Step 1, the eNB is able to recognize the new RRC message; hence impact to legacy random access procedure can be avoided.

If the random access preamble or the PRACH resource can implicitly indicate a more detailed D2D resource request information such as the required resource amount and priority as described in Step 1 of this example, then the Msg3 may only contain information not already conveyed in Step 1, such as the reservation period required and information required for contention resolution (if contention is possible).

The D2D Msg3 can also be a new MAC control element as described in Example 1.

Step 4: After detection of Msg3 sent by the UE, the eNB sends a contention-free D2D resource assignment to the UE (HARQ retransmission is supported to improve reception reliability at the UE), which is represented by a set of time-frequency resources. The details of this step can be similar to that described for Example 1.

Example 3

Step 1: UE sends a random access preamble using PRACH resource reserved for D2D contention free request
  Examples of PRACH resource reserved for D2D contention free request includes dedicated preamble for D2D, dedicated time/freq PRACH resource for D2D)
  The random access preamble can be used to implicitly indicate specific control information between sets of potential D2D resources. For example preamble A can be used to indicate a set of resource blocks for a given number of subframes appropriate for transmitting a VoIP packet, while preamble B indicates a different set of resource blocks and subframes for a UE requesting to transmit a video packet. Different preambles also can be utilized to indicate UE priority with regards to accessing the transmission medium (e.g. emergency call vs. normal traffic).
  It is assumed that contention among multiple D2D UEs may not occur, i.e. UEs are assigned dedicated D2D preamble(s) or D2D PRACH resource(s).

Figure 17B:
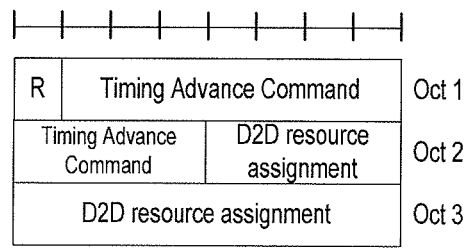

Step 2: eNB detects the D2D preamble/PRACH and sends a RAR with UL grant for Msg 3
  The RAR contains a contention-free D2D resource assignment to the UE. A 12 bit resource assignment example is shown in FIG. 17B. The timing advance command can be used to indicate the timing advance with respect to the DL serving cell signal to be assumed by the UE for D2D signal transmission.
  The resource assignment information can be similar to that described in Step 4 of Example 1, but is transmitted in the D2D RAR.
  The eNB also can reject UE's request, in which case, the UE attempts to perform random access again after a random backoff. The backoff parameter can be signaled in a SIB.

The example random access procedures can be applied to UE in idle or RRC connected mode. However in the case of a D2D UE in idle mode, the UE remains in idle mode after successful completion of RACH procedure (i.e. in Example 1 and Example 2, Temporary Radio Network Temporary Identifier (Temporary RNTI) is not promoted to Cell RNTI (C-RNTI)).

It should be noted that while the random access procedure has been described for the purpose of D2D contention-free resource request, the procedure can be easily reused with trivial modification for the purpose of a full network controlled or centralized D2D resource request.

If resource reservation ID is indicated to the UE as part of D2D resource assignment in the random access procedure, the UE can use the ID to request for extension of resource reservation if the resource assigned is about to expire.

An example random access procedure for resource extension request can be modified based on Example 1 for D2D resource request as described in Example 4 below:

Example 4

Step 1: UE sends a random access preamble
  Preamble and PRACH resource can be selected from the set of preambles and PRACH resources according to configuration in SIB2 for contention based random access procedure.
  To support contention-free random access procedure, the eNB can assign a dedicated preamble for the UE beforehand.

Step 2: eNB detects preamble request and sends a random access response (RAR) with UL grant for Msg 3
  The timing advance command in RAR can be used to indicate the timing advance with respect to the DL serving cell signal to be assumed by the UE for D2D signal transmission.

Figure 17C:
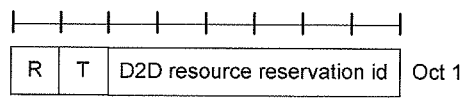

Step 3: After detection of RAR at the UE, the UE sends a Msg3 containing the reason for the random access initiation, i.e. request for extending D2D contention-free resource assignment. MAC signaling can be employed. The same LCID value can be reserved for D2D resource request as shown in Table 4. One bit in the D2D resource request MAC control element can be used to indicate UE's request for reservation period extension. For example, in the example shown in FIG. 17C, the bit labeled indicates initial or new resource request if it is '0' and indicates request for extension of D2D resource assignment if it is '1'. Depending upon the value for 'T', the rest of the field either indicates the details of D2D resource assignment request or the D2D resource reservation id, i.e. if T is '0', the rest of the field indicates the D2D resource request information as shown in FIG. 17A, otherwise, the rest of the field indicates D2D resource reservation id as shown in FIG. 17C (the field length of D2D resource reservation id may or may not be the same as that of D2D resource request information. Same size is shown in the figures).

Step 4: After detection of resource extension request, the eNB can agree to extend the reservation period as per UE's request. The eNB also can assign a new resource for the UE to replace the previously assigned resource. The eNB also can reject UE's request, in which case the resource shall expire after the end of the reservation period and the UE can attempt to perform random access again after a random backoff. The backoff parameter can be signaled in a SIB.

In case of partial network operation as shown in FIG. 6, the feedback can be identical or based upon the DTII as previously mentioned. In one alternative the out-of-coverage (OOC) DTII can serve as a discovery mechanism by including the D2D ID (e.g. D2D RNTI) of the OOC UE instead of or in addition to channel quality and interest notification messages from the OOC UEs. The scheduling and time/frequency allocation of resources for the OOC DTII can be provided by UE1 via the D2D SIB, as part of the DCCH or embedded in the broadcast message itself. Alternatively, the OOC DTII can be transmitted using a contention-based mechanism such as used by the RACH in the LTE system.

In the case of the out-of-network operation, as shown in FIG. 7, contention-free D2D resource reservation methods as described can also be applied for, by replacing the role of the eNB 102 in FIG. 5 with the group leader UE 701.

The following embodiments are described assuming the D2D UEs are operating within the coverage of an LTE/LTE-A network and that D2D resource allocation or coordination is handled by the serving eNB. However, it should be understood that the embodiments are also applicable for the case where all UEs are out of coverage of a network and the role of coordinating resource allocation is assumed to be handled by a UE group leader.

In one embodiment of this disclosure (hereinafter referred to as "Embodiment P1"), a UE capable of D2D transmission can be configured with a downlink resource by the network for the purpose of transmitting broadcast or groupcast or multicast messages to at least a second UE. Upon configuration by the network, the UE can use the configured downlink resource to transmit broadcast messages. The downlink resource can either be downlink subframes, a set of OFDM symbols of a downlink subframe or a set of physical resource blocks of a downlink subframe.

A UE transmitting D2D signals can transmit D2D signals using the timing and/or frequency that are synchronized with its serving cell. A UE receiving D2D signals can receive the D2D signals using the same time and/or frequency as for receiving the signals from the serving cell. In other words, the receiver UE assumes that the D2D signals are quasi co-located with the serving cell's signals such as Common/Cell-specific RS (CRS)/Primary Synchronization Signal (PSS)/Secondary Synchronization Signal (SSS) in terms of average delay, frequency shift (or, Doppler spread and Doppler shift).

In case there is a sufficiently large difference between the transmission timing and frequency of the UE transmitting D2D signals and the serving cell's signals, then it may be more appropriate that a UE cannot assume the D2D signals are quasi co-located with the serving cell's signal such as CRS/PSS/SSS, in terms of delay spread, Doppler spread, Doppler shift, average gain and average delay. Further details are disclosed in Embodiment P5 herein below.

According to 3GPP LTE Rel-11 specifications (REF1, REF3, REF5, REF7), the network can configure a set of subframes as Multimedia Broadcast multicast service Single Frequency Network (MBSFN) subframes. An MBSFN subframe can be used to carry to Physical Multicast Channel (PMCH) for providing Multimedia Broadcast Multicast Service (MBMS) services, or Physical Downlink Shared CHannel (PDSCH) for UEs configured with transmission mode 9 or transmission mode 10. MBSFN subframe configuration of a cell is transmitted in System Information Block 2 (SIB2). Upon reading SIB2, a UE knows the MBSFN subframe configuration of the cell.

In one example, downlink resource for D2D transmission can be configured in MBSFN subframes, where the D2D downlink resource are not used for PMCH, unicast PDSCH or Physical Downlink Control CHannel (PDCCH) or Enhanced PDCCH (EPDCCH). The data region of MBSFN subframes does not contain cell-specific reference signals (CRS port 0-port 3); therefore allowing a D2D transmission to be free from CRS interference.

Figure 18:
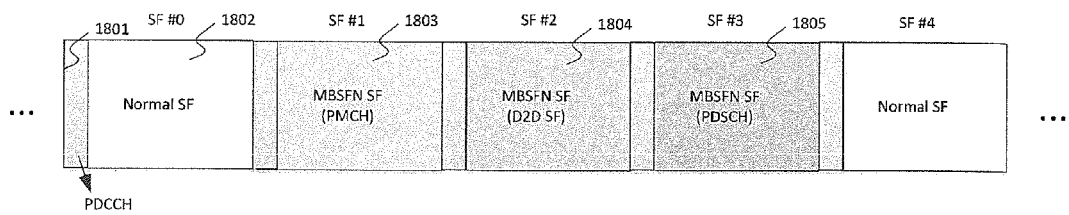
FIG. 18 illustrates an example of MBSFN subframes reserved for D2D communications according to this disclosure.

In one example, a set of MBSFN subframes can be configured for D2D transmission, e.g. by RRC signaling or common control broadcast (in a SIB message). If a MBSFN subframe is configured for D2D transmission, the whole MBSFN subframe except the PDCCH control region is reserved for D2D transmission, i.e., PMCH, unicast PDSCH, EPDCCH are not transmitted in the subframe. This design can be useful if there is a large discrepancy in the timing and/or the frequency between signals from a UE transmitting D2D signals and signals from a serving cell. An example is illustrated in FIG. 18. FIG. 18 illustrates an example of MBSFN subframes reserved for D2D communications according to this disclosure. The embodiment of the MBSFN subframes shown in FIG. 18 are for illustration only. Other embodiments could be used without departing from the scope of the present disclosure.

Figure 19:
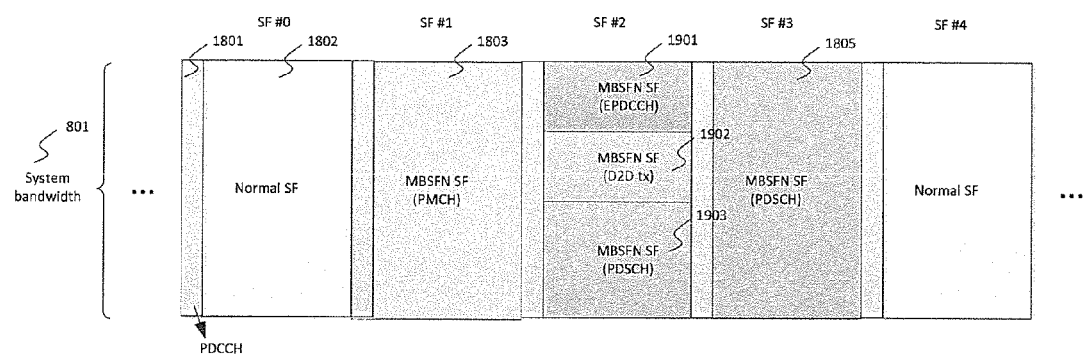
FIG. 19 illustrates an example of a set of PRB-pairs within a MBSFN subframe that are reserved for D2D communications according to this disclosure.

In another example, a set of physical resource block (PRB) pairs in a set of MBSFN subframes can be configured for D2D transmission. In this case, the set of physical resource blocks pairs within the MBSFN subframe is reserved for D2D transmission by the network; the network is not supposed to transmit signals in the set of physical resource block pairs. The other physical resource blocks within the same subframe can still be used for unicast PDSCH transmission or EPDCCH transmission, i.e. physical resource blocks for unicast PDSCH, EPDCCH and D2D transmission can be multiplexed in frequency in the same MBSFN subframe. The physical resource blocks reserved by the network for D2D transmission can be signaled by the higher layer to the UE. An example is illustrated in FIG. 19. FIG. 19 illustrates an example of a set of PRB-pairs within a MBSFN subframe that are reserved for D2D communications according to this disclosure. The embodiment of the PRB-pairs within a MBSFN subframe shown in FIG. 19 are for illustration only. Other embodiments could be used without departing from the scope of the present disclosure.

Hereinafter, downlink subframes that are configured for D2D transmission are referred to as D2D subframes.

Figure 20:
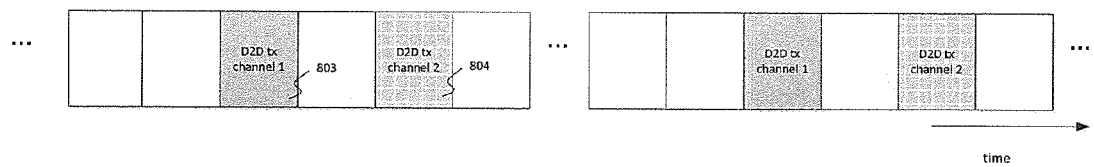
FIG. 20 illustrates an example of D2D communication channels multiplexed in time according to this disclosure.
Figure 21:
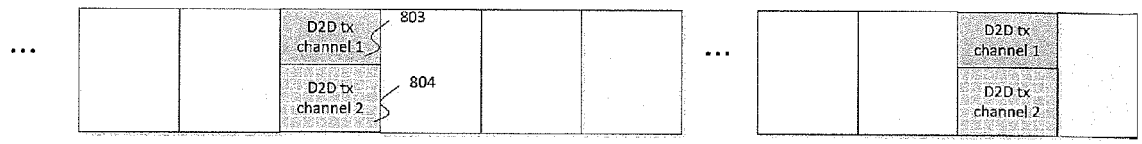
FIG. 21 illustrates an example of D2D communication channels multiplexed in time and frequency according to this disclosure.

Multiple D2D transmission channels can be defined for the downlink resource reserved for D2D transmission. Each D2D transmission channel occupies a subset of the downlink resource reserved for D2D transmission. A D2D transmission channel can be transmitted in one or multiple D2D subframes (e.g. in periodic or aperiodic manner). In one example, D2D transmission channels can be multiplexed in time (FIG. 20 illustrates an example). In another example, D2D transmission channels can be multiplexed in both time and frequency (FIG. 21 illustrates an example). Spatial reuse of D2D transmission channels can also be done if more than one D2D RS ports or sequences can be defined (Further details are disclosed in Embodiment P3). Therefore, a D2D transmission channel can be defined by one or more of the following:
  The DL subframes configuration (subframe periodicity and subframe offset);
  A set of physical resource blocks (number of PRBs and its location within the system bandwidth)
    Other alternatives for a D2D transmission channel can be a set of OFDM symbols of D2D subframes or a set of resource blocks of D2D subframes.
  D2D RS port configuration (port index, D2D RS scrambling identity).
  D2D transmission channel identity (e.g. can be for D2D transmission channel information bit scrambling, further details are disclosed in Embodiment P4)

A UE capable of D2D transmission can be configured with one or more D2D transmission channels. Upon configuration, a UE capable of D2D transmission can transmit in one or more of the configured D2D transmission channels.

A UE capable of D2D reception can be configured to receive from one or more D2D transmission channels. Upon configuration, a UE capable of D2D reception can receive from one or more D2D transmission channels. A UE capable of D2D reception also can choose to receive from one or more D2D transmission channels autonomously based on UE interest without explicit configuration from the network.

A UE capable of D2D transmission can request for one or more D2D transmission channels from the network. In response to the UE request, the network can configure one or more D2D transmission channels to the UE.

In one method, a UE capable of D2D reception is instructed to receive the D2D signals in the configured D2D transmission channels.

In another method, a UE capable of D2D reception tries to detect detection signals in all available D2D transmission channels and once the UE detects the signals then the UE can choose to receive one or more of the detected D2D transmission channels. In one example, the detection signals are the D2D reference signals used for demodulation of the D2D data. In another example, the detection signals are separately designed detection signals, which could be the one used for UE discovery.

In one embodiment of this disclosure (hereinafter referred to as "Embodiment P1a"), a UE capable of D2D transmission can be configured with an uplink resource by the network for the purpose of transmitting broadcast or groupcast or multicast messages to at least a second UE. Upon configuration by the network, the UE can use the configured uplink resource to transmit broadcast messages. The uplink resource can either be uplink subframes, a set of OFDM symbols of an uplink subframe or a set of physical resource blocks of an uplink subframe.

A UE transmitting D2D signals can transmit D2D signals using the timing and/or frequency (uplink frequency) that are synchronized with transmission on legacy uplink subframes. A UE receiving D2D signals can receive the D2D signals using the same time and/or frequency as transmitting on legacy uplink subframes.

In case there is a sufficiently large difference between the transmission timing and frequency of the UE transmitting D2D signals and the UE receiving D2D signals, then it may be more appropriate that a UE receiving D2D signals cannot receive the D2D signals using the same time and/or frequency as transmitting on legacy uplink subframes. If the UE receiving D2D signals is operating in RRC IDLE mode, the UE may not know the accurate transmission timing of the legacy UL subframes. Methods of the UE synchronizing with synchronization signals from a second UE transmitting D2D signals as described in Embodiment P5 (described herein below) can be applied.

In another alternative, a UE transmitting (receiving) D2D signals should transmit (receive) D2D signals using the timing and/or frequency that are synchronized with the serving cell's downlink subframes. This may be beneficial if the UEs can be in RRC IDLE mode where the UL timing is not known to the UE. In this case, the time/frequency synchronization described in Embodiment P1 and P5 (described herein below) can be applied.

In one example, uplink resource for D2D transmission can be configured, where the D2D uplink resource shall not be used for Physical Uplink Control CHannel (PUCCH)/Physical Uplink Shared CHannel (PUSCH)/Sounding RS (SRS); therefore allowing a D2D transmission to be free from uplink interference.

Figure 22:
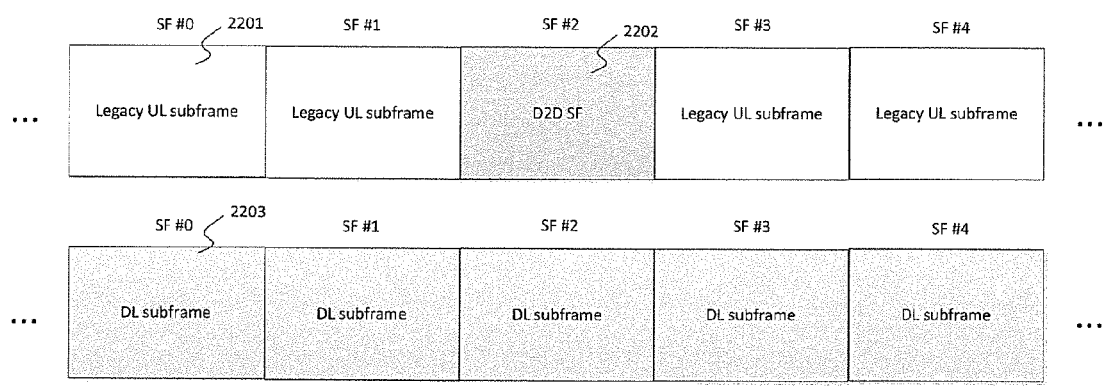
FIG. 22 illustrates an example of uplink subframes reserved for D2D communications in a FDD system according to this disclosure.
Figure 23:
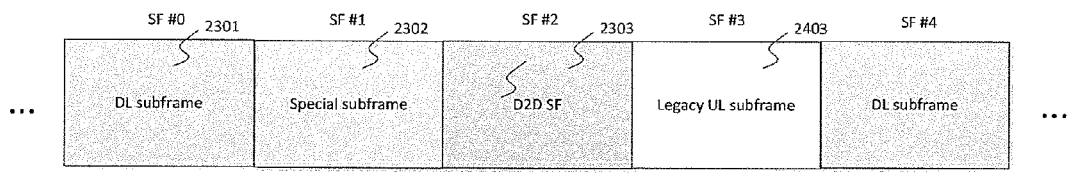
FIG. 23 illustrates an example of uplink subframes reserved for D2D communications in a TDD system according to this disclosure.

In one example, a set of uplink subframes can be configured for D2D transmission, e.g., by RRC signaling or common control broadcast (in a SIB message). If an uplink subframe is configured for D2D transmission, the whole uplink subframe is reserved for D2D transmission, i.e. PUCCH/PUSCH/SRS are not transmitted by any UE in the subframe. Examples are illustrated in FIG. 22 for FDD system and FIG. 23 for TDD system.

Figure 24:
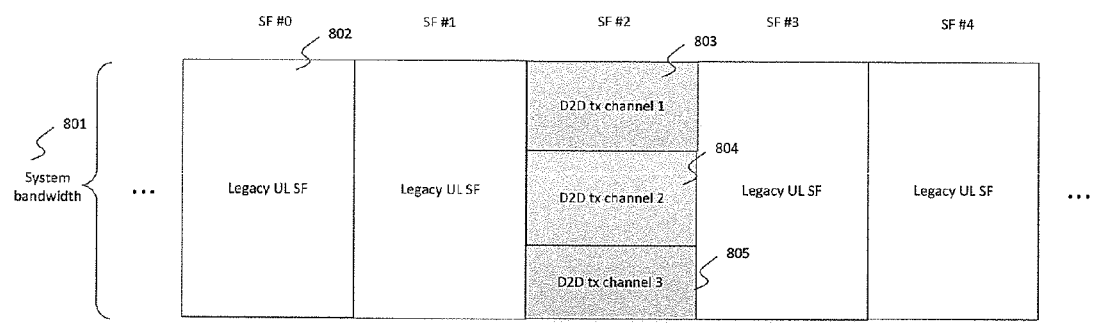
FIG. 24 illustrates an example of a set of PRB-pairs within an uplink D2D subframe reserved for D2D communications according to this disclosure.

In another example, a set of physical resource block pairs in a set of uplink subframes can be configured for D2D transmission. In this case, the set of physical resource blocks pairs within the UL subframe is reserved for D2D transmission by the network; other UE is not supposed to transmit signals in the set of physical resource block pairs. The other physical resource blocks within the same subframe can still be used for PUCCH/PUSCH/SRS transmissions, i.e. physical resource blocks for PUCCH/PUSCH/SRS and D2D transmission can be multiplexed in frequency in the same uplink D2D subframe. The physical resource blocks reserved by the network for D2D transmission can be signaled by the higher layer to the UE. An example is illustrated in FIG. 24. UEs engaging in D2D transmission/reception in a subframe may not want to transmit PUCCH/PUSCH/SRS in the same subframe even though D2D transmission/reception and network transmission/reception are performed in different resource blocks. For this reason, UEs interested in D2D transmission/reception can inform the network about the intention to engage in D2D activity and the uplink subframes to be used for D2D activity so that the network can avoid scheduling or configuring PUCCH/PUSCH/SRS transmissions in the uplink subframes concerned for the UEs concerned.

Hereinafter, uplink subframes that are configured for D2D transmission are referred to as D2D subframes. In one example the set of D2D subframes is referred to as a D2D resource pool. The D2D resource pool can include both resources for D2D transmission and reception, or a D2D resource pool configuration may only indicate a set of resources for transmission or reception. One or multiple D2D resource pools can be configured by the network, where each resource pool may correspond to a group identity (e.g. police, military, commercial use, etc.) or may correspond to a configuration identity (e.g. infrastructure-assisted D2D or adhoc mode D2D operation).

Multiple D2D transmission channels can be defined for the uplink resource reserved for D2D transmission. Each D2D transmission channel occupies a subset of the uplink resource reserved for D2D transmission. A D2D transmission channel can be transmitted in one or multiple D2D subframes (e.g. in periodic or aperiodic manner). In one example, D2D transmission channels can be multiplexed in time (same as FIG. 22 or FIG. 23). In another example, D2D transmission channels can be multiplexed in both time and frequency (FIG. 24). Spatial reuse of D2D transmission channels can also be done if more than one D2D RS ports or sequences can be defined (further details in Embodiment P3). Therefore, a D2D transmission channel can be defined by one or more of the following:

- The uplink subframes configuration (subframe periodicity and subframe offset);
- A set of physical resource blocks (number of PRBs and its location within the system bandwidth)
  - Other alternatives for a D2D transmission channel can be a set of O1-DM symbols of D2D subframes or a set of resource blocks of D2D subframes.
- D2D RS port configuration (port index, D2D RS scrambling identity).
- D2D transmission channel identity (e.g. can be for D2D transmission channel information bit scrambling, further details are described in Embodiment P4)
- D2D resource pool configuration identity
- D2D groupcast identity It should be noted that the above definitions can be explicitly or implicitly linked or interchangeable. For example a D2D resource pool configuration identity can have 1:1 or 1:M (where M is an integer greater than 1) correspondence to D2D groupcast identities or vice versa.

A UE capable of D2D transmission can be configured with one or more D2D transmission channels. Upon configuration, a UE capable of D2D transmission can transmit in one or more of the configured D2D transmission channels.

A UE capable of D2D reception can be configured to receive from one or more D2D transmission channels. Upon configuration, a UE capable of D2D reception can receive from one or more D2D transmission channels. A UE capable of D2D reception also can choose to receive from one or more D2D transmission channels autonomously based on UE interest without explicit configuration from the network.

A UE capable of D2D transmission can request for one or more D2D transmission channels from the network. In response to the UE request, the network can configure one or more D2D transmission channels to the UE.

In one method, a UE capable of D2D reception is instructed to receive the D2D signals in the configured D2D transmission channels.

In another method, a UE capable of D2D reception tries to detect detection signals in all available D2D transmission channels and once the UE detects the signals then the UE can choose to receive one or more of the detected D2D transmission channels. In one example, the detection signals are the D2D reference signals used for demodulation of the D2D data. In another example, the detection signals are separately designed detection signals, which could be the one used for UE discovery.

In one embodiment of this disclosure (hereinafter referred to as "Embodiment P2"), a set of physical resource blocks or downlink subframes e.g., in accordance with Embodiment P1 (or uplink subframes, e.g. in accordance with Embodiment P1a), can be indicated by the network via higher layer signaling to be reserved for D2D transmission channels. Resource of a D2D transmission channel consists of a set of physical resource blocks in a D2D subframe. The physical resource blocks of a D2D transmission channel is signaled by the network to the UEs by resource allocation signaling.

In one alternative, physical resource blocks of a D2D transmission channel is allocated by the network. The UE transmitting D2D signals can request for resource allocation from the network, e.g., the number of required PRBs can be indicated by the UE. In response to the request, the network informs the UE of the physical resource blocks to be used for D2D transmission. The network then advertises the D2D transmission channel configuration, e.g., on a System Information Block (SIB), so that UEs interested in the D2D transmission channel can receive the corresponding D2D messages using the advertised D2D transmission channel configuration. Change in resource allocation or in general a D2D transmission channel configuration can be informed to UEs by paging or by a PDCCH with Cyclic Redundancy Check (CRC) scrambled by an RNTI dedicated for this purpose (D2D-RNTI). The UE transmitting D2D signals can also signal the resource allocation and other control information to the UE receiving D2D signals using a D2D control channel. The UE transmitting D2D signals can also inform the network of its intention to terminate the D2D transmission. Upon receiving the UE's message, the network then releases the corresponding D2D transmission channel and updates the corresponding content in SIB. The network can send paging message or by a PDCCH with CRC scrambled with D2D-RNTI to inform the UEs of the SIB change. An advantage of the above signaling method is that the above signaling enables D2D transmission and reception for both RRC connected UE and RRC idle UE. The D2D resource that can be requested by the UE and assigned by the network can be DCCH (sometimes also known as scheduling assignment channel) or D2D data channel.

In one method of D2D resource request signaling, a D2D resource can be requested by the UE via a higher layer message (either a MAC message or a RRC message). The higher layer message can contain the priority of request, the amount of resources required (e.g. in the form of a D2D Buffer Status Report (D2D BSR) which is MAC message, or a D2D resource set indicator as in Table 6b) and the required length of resource reservation period. Alternatively, the higher layer message can contain the amount of data (in bytes or bits) that is currently contained in the UE's D2D buffer for transmission. If a UE has D2D data to transmit and has not been assigned a D2D resource or has not been given an UL grant to send the D2D resource request, the UE can send a Scheduling Request (SR) using PUCCH format 1 or a random access procedure if the UE has no valid PUCCH resource for SR configured in any TTI. If the network responds with an UL grant, the UE can then transmit the D2D resource request information to the network using the resources provided in the UL grant.

In one example, the D2D resource request in the higher layer message includes a set of indices, one index for one information field that is predefined or preconfigured. In the example below, 6 bits of information can be used to indicate the priority (Table 6a illustrates indication of priority of D2D request with 2 bits), the time-frequency resource set required (Table 6b illustrates indication of D2D resource request set with 2 bits) as well as the resource reservation period (Table 6c illustrates indication of D2D resource reservation period request with 2 bits). The mapping tables (Table 6a, Table 6b, Table 6c) can be signaled by the network in a SIB (D2D-SIB). In this example, one byte MAC control element can be used to convey the control information (see FIG. 17A).

In another alternative, the indices for priority, resource set request, and reservation period request may be combined to jointly indicate parameters. This is advantageous in the case that not all exhaustive combinations of parameters are supported by the network or UEs. Table 7 gives an example index mapping to a joint parameter configuration.

Figure 25:
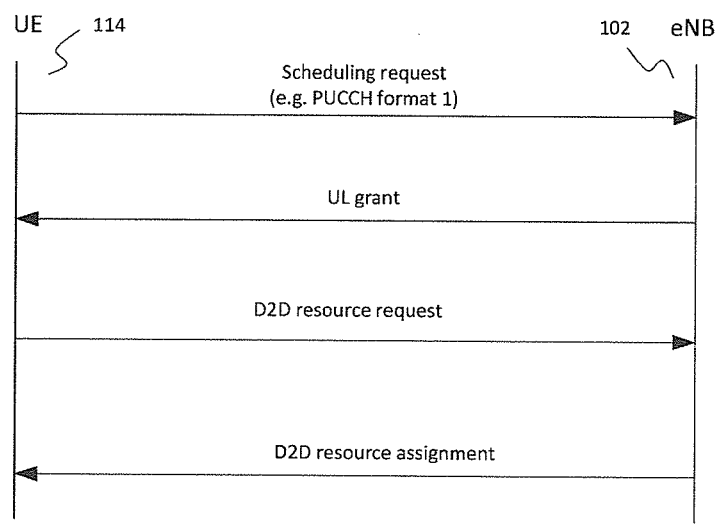
FIG. 25 illustrates an example of signaling for a network-assisted D2D resource request and allocation procedure according to this disclosure.

An example procedure for D2D resource request is given in FIG. 25. In this procedure, the UE 114 sends a scheduling request to the eNB 102. The eNB then responds by sending an UL grant to the UE. The UE then sends a D2D resource request message to the eNodeB. Finally, the eNodeB responds to the UE's request by sending a D2D resource assignment message.

Figure 26:
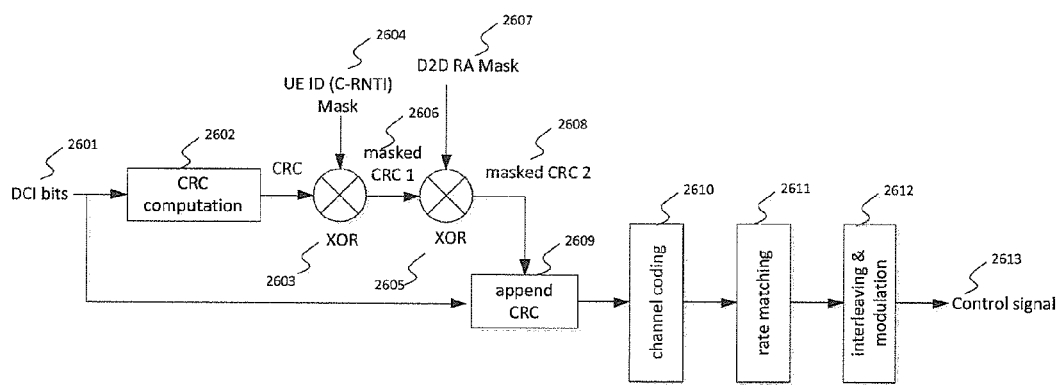
FIG. 26 illustrates an example of transmitter chain for PDCCH for D2D resource allocation according to this disclosure.

FIG. 26 illustrates an example of transmitter chain for PDCCH for D2D resource allocation according to this disclosure. The embodiment of the transmitter chain shown in FIG. 26 is for illustration only. Other embodiments could be used without departing from the scope of the present disclosure. The transmitter can be implemented in an eNB, such as eNB 102.

In a first method of D2D resource assignment signaling, a D2D resource assignment can be signaled by the network via a higher layer message (either a MAC message or a RRC message).

In a second method of D2D resource assignment signaling, a D2D resource assignment can be signaled by the network via a PDCCH/EPDCCH using a Downlink Control Information (DCI) format. The DCI format for indicating resource assignment can be based on an existing DCI format that the UE is already monitoring in order not to increase the number of PDCCH/EPDCCH blind decodes that the UE has to perform. In one example, this DCI format can be based on DCI format 1A; other DCI formats can also be used. Alternatively, a new DCI format can be specified. The CRC of the PDCCH can be scrambled by the C-RNTI of the UE.

In this case, there is a need to specify how the UE can determine that the PDCCH detected is for D2D resource assignment, rather than for other purposes such as for conventional downlink assignment or for PDCCH order to trigger a random access procedure.

Assume $b_0, b_1, b_2, b_3, \ldots, b_{B-1}$ to be the DCI bits, including the payload (with A bits) and the CRC parity bits (with 16 bits). In a first approach to determine the purpose of DCI format 1A for D2D resource allocation, the CRC parity bits with DCI format 1A are scrambled with the D2D resource allocation mask $x_{AS,0}, x_{AS,1}, \ldots, x_{AS,15}$ as indicated in Table 12 for an example and the corresponding RNTI $x_{rnti,0}, x_{rnti,1}, \ldots, x_{rnti,15}$ to form the sequence of bits $c_0, c_1, c_2, c_3, \ldots, c_{B-1}$. The relation between $c_k$ and $b_k$ is:

$c_k = b_k$ for $k=0,1,2,\ldots,A-1$ $c_k = (b_k + x_{rnti,k-A} + x_{AS,k-A}) \bmod 2$ for $k=A, A+1, A+2, \ldots, A+15$.

By detecting the mask value, the UE can determine if the DCI format 1A detected is for normal cellular operation or for D2D resource allocation purpose.

TABLE 12

| Purpose of DCI format 1A | D2D resource allocation mask $\langle x_{AS,0}, x_{AS,1}, \ldots, x_{AS,15} \rangle$ |
| --- | --- |
| Conventional DCI format 1A | <0, 0, 0, 0, 0, 0, 0, 0, 0, 0, 0, 0, 0, 0, 0, 0> |
| DCI format 1A for D2D resource allocation | <0, 0, 0, 0, 0, 0, 0, 0, 0, 0, 0, 0, 0, 0, 0, 1> |

In a second approach to determine the purpose of DCI format 1A for D2D resource allocation, the UE shall determine that the DCI format 1A is used for D2D resource allocation if the information bits in the DCI are determined to be according to a predefined structure or a code point (e.g. one or more information fields satisfy a set of predefined conditions); the UE shall determine that the DCI format 1A is used for other purpose such as normal DL assignment with one codeword otherwise. One example is as follows:
Carrier indicator—0 bit.
Flag for format0/format1A differentiation—1 bit, value 1 is indicated for format 1A Format 1A is used for D2D resource assignment only if format 1A CRC is scrambled with C-RNTI and all the remaining fields are set as follows:
Resource block assignment—x1 bits,
Resource reservation period—x2 bits
Resource reservation id—x3 bits (The resource reservation id can be used by the UE for resource reservation extension request)
All the remaining bits in format 1A for compact scheduling assignment of one PDSCH codeword are set to zero Other information that can be included in the DCI is the TPC and the cyclic shift for DM RS and OCC index for the D2D PUSCH.

In another example of DCI format used for resource allocation by the network to a D2D broadcast UE, the DCI format can be based on DCI format 0.

Assume $b_0, b_1, b_2, b_3, \ldots, b_{B-1}$ to be the DCI bits, including the payload (with A bits) and the CRC parity bits (with 16 bits). In a first approach to determine the purpose of DCI format 0 for D2D resource allocation, the CRC parity bits with DCI format 0 are scrambled with the D2D resource allocation mask $x_{AS,0}, x_{AS,1}, \ldots, x_{AS,15}$ as indicated in Table 13 for examples and the corresponding RNTI $x_{rnti,0}, x_{rnti,1}, \ldots, x_{rnti,15}$ to form the sequence of bits $c_0, c_1, c_2, c_3, \ldots, c_{B-1}$. The relation between $c_k$ and $b_k$ is:

$c_k = b_k$ for $k=0,1,2,\ldots,A-1$ $c_k = (b_k + x_{rnti,k-A} + x_{AS,k-A}) \bmod 2$ for $k=A, A+1, A+2, \ldots, A+15$.

By detecting the mask value, the UE can determine if the DCI format 0 detected is for normal cellular operation or for D2D resource allocation purpose.

TABLE 13

| Purpose of DCI format 0 | CRC mask $\langle x_{AS,0}, x_{AS,1}, \ldots, x_{AS,15} \rangle$ |
| --- | --- |
| Conventional DCI format 0 (UE transmit antenna selection port 0) | <0, 0, 0, 0, 0, 0, 0, 0, 0, 0, 0, 0, 0, 0, 0, 0> |
| Conventional DCI format 0 (UE transmit antenna selection port 1) | <0, 0, 0, 0, 0, 0, 0, 0, 0, 0, 0, 0, 0, 0, 0, 1> |
| DCI format 0 for D2D resource allocation (example 1) | <0, 1, 0, 1, 0, 1, 0, 1, 0, 1, 0, 1, 0, 1, 0, 1> |
| DCI format 0 for D2D resource allocation (example 2) | <0, 0, 0, 0, 0, 0, 0, 0, 0, 0, 0, 0, 0, 0, 1, 0> |
| DCI format 0 for D2D resource allocation (example 3) | <0, 0, 0, 0, 0, 0, 0, 0, 0, 0, 0, 0, 0, 0, 1, 1> |

FIG. 26 illustrates the eNB transmitter functions for the transmission of a DCI format for D2D resource allocation in a PDCCH. The eNB separately codes and transmits each DCI format in a respective PDCCH. The MAC layer identity of the UE (UE_ID or C-RNTI) for which a DCI format is intended for masks the Cyclic Redundancy Check (CRC) of the DCI format codeword in order to enable the UE to identify that the particular DCI format is intended for it. The CRC of the (non-coded) DCI format bits 2601 is computed 2602 and it is subsequently masked using the exclusive OR (XOR) operation 2603 (XOR(0,0)=0, XOR(0,1)=1, XOR(1, 0)=1, XOR(1,1)=0) between CRC and UE_ID bits 2604. For D2D resource assignment, a second masking operation is performed using the XOR operation 2605 between the masked CRC 2606 after the first masking operation and the D2D resource allocation mask 2607. The final masked CRC 2608 is then appended to the DCI format bits 2609, channel coding is performed 2610, for example using a convolutional code, followed by rate matching to the allocated resources 2611, and finally by interleaving, modulation 2612, and transmission of the control signal 2613.

Figure 27:
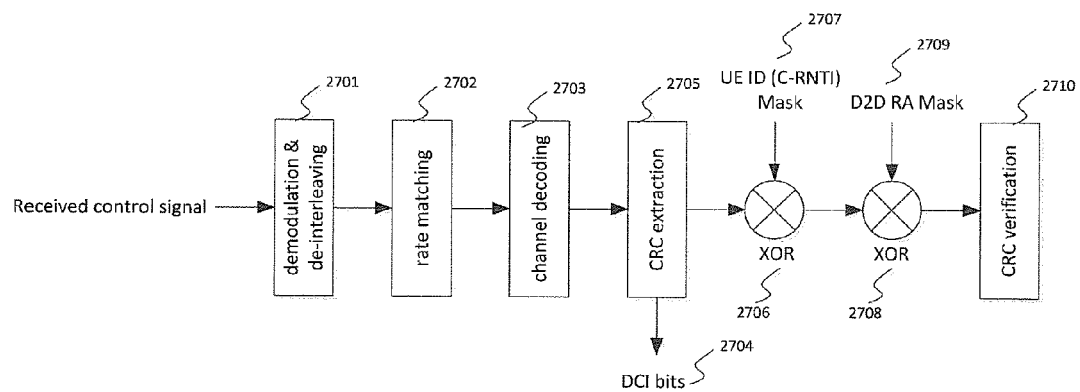
FIG. 27 illustrates an example of receiver chain for PDCCH for D2D resource allocation according to this disclosure.

FIG. 27 illustrates an example of receiver chain for PDCCH for D2D resource allocation according to this disclosure. The embodiment of the receiver chain shown in FIG. 27 is for illustration only. Other embodiments could be used without departing from the scope of the present disclosure. The receiver can be implemented in a UE such as UE 114.

FIG. 27 illustrates the UE receiver operations for the reception of a D2D resource allocation DCI in a PDCCH. The UE receives and demodulates the received control signal assuming DCI format 0/1A, de-interleaves the resulting bits 2701, restores the rate matching applied at the eNB transmitter 2702, and subsequently decodes the encoded control information 2703. After decoding, the UE receives obtains the DCI bits 2704 after extracting the CRC bits 2705 which are then de-masked by applying the XOR operation 2706 with the UE_ID 2707. A second de-masking operation is then performed by applying the XOR operation 2708 with the D2D resource allocation mask 2709. Finally, the UE receiver performs a CRC 2710. If the CRC test passes, the UE performs further checks on the parameters of DCI bits, e.g. whether the DCI format is format 0 by checking the format flag if only DCI format 0 can be used for D2D resource allocation purpose. If verification of the DCI parameters passes, the UE considers the DCI format as a valid one and determines the parameters for D2D resource allocation; else the UE disregards the presumed DCI format. If the CRC test does not pass, the UE performs further CRC without the D2D resource allocation or other RNTI to identify the purpose the DCI. If all CRC fails, the UE disregards the presumed DCI format.

In a second approach to determine the purpose of DCI format 0 for D2D resource allocation, the UE determines that the DCI format 0 is used for D2D resource allocation if the information bits in the DCI is determined to be according to a predefined structure or a code point (e.g. one or more information fields satisfy a set of predefined conditions); the UE determines that the DCI format 0 is used for other purpose, e.g. normal UL grant otherwise. A first example of the second approach is as follows:

Carrier indicator—0 bit.
Flag for format0/format1A differentiation—1 bit, value 1 is indicated for format 1A Format 0 is used for D2D resource assignment only if format 0 CRC is scrambled with C-RNTI and all the remaining fields are set as follows:
Resource block assignment—x1 bits,
Resource reservation period—x2 bits
Resource reservation id—x3 bits (The resource reservation id can be used by the UE for resource reservation extension request)
TPC command for scheduled D2D resource—2 bits
Cyclic shift for DM RS and OCC index for the D2D PUSCH—3 bits
All the remaining bits in format 0 for the scheduling of PUSCH in one UL cell are set to zero.

In a second example of the second approach, DCI format 0 for D2D resource allocation is the same as the DCI format 0 for normal UL grant as defined in Sec 5.3.3.1.1 of REF2 and the "Resource block assignment and hopping resource allocation" field can be reused to indicate the allocation of D2D resource. The "TPC command for scheduled PUSCH" field can also be reused to indicate the TPC command for scheduled D2D resource and the "cyclic shift for DM RS and OCC index" can be reused to indicate the cyclic shift for DM RS and OCC index for the D2D PUSCH. A UE recognizes that a DCI format 0 is for D2D resource allocation if a set of conditions on the "Modulation and coding scheme and redundancy version" field ($I_{MCS}$) and the number of PRBs indicated by the "Resource block assignment and hopping resource allocation" field ($N_{PRB}$) is satisfied. For instance, DCI format 0 is used for D2D resource allocation if $I_{MCS}$=30 and $N_{PRB}$≤P, where P is an integer, e.g. 1, 2, 3, 4.

In a third example of the second approach, the UE recognizes that a DCI format 0 is for D2D resource allocation instead of zeros, a predefined bit sequence is appended DCI format 0 until the payload size equals that of format 1A. For instance, ones are appended to format 0 until the payload size equals that of format 1A. If a UE determines that ones are appended to format 0 until the payload size equals that of format 1A, the UE determines the DCI format 0 is for D2D resource allocation; else if the UE determines that zeros are appended to format 0 until the payload size equals that of format 1A, the UE determines the DCI format 0 is for normal UL grant.

Figure 28:
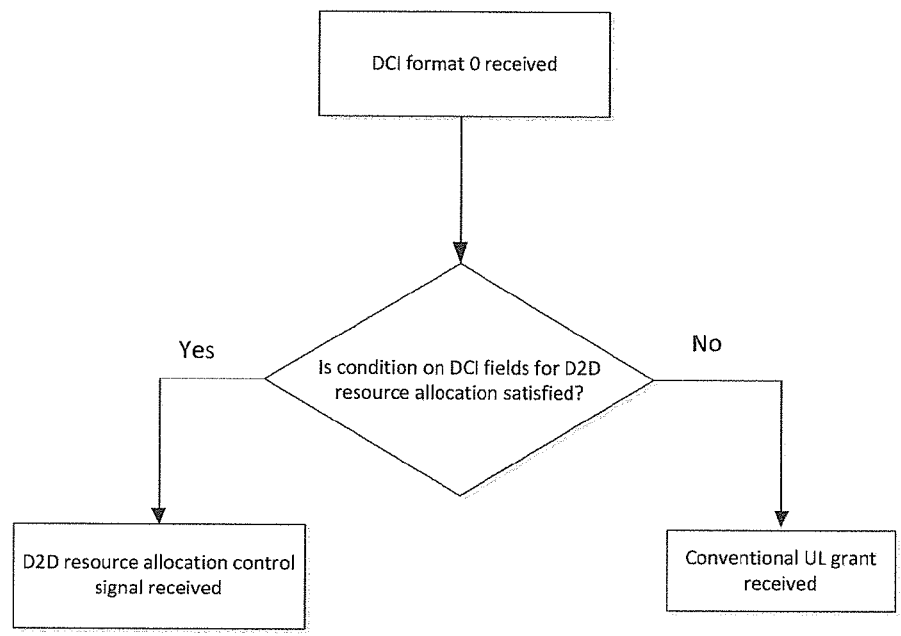
FIG. 28 illustrates an example of UE procedure in determining the purpose of DCI format 0 detected according to this disclosure.

FIG. 28 illustrates an example of UE procedure in determining the purpose of DCI format 0 detected according to the second or third example of the second approach. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In a third approach, a combination of the aforementioned approaches can be applied. For instance, if a UE determines that the D2D resource allocation mask has been applied to the CRC of a DCI format 0 and a set of conditions on the information bit fields are both satisfied, then the DCI format 0 is for D2D resource allocation.

Similar principles illustrated for DCI format 1A and DCI format 0 above can also be applied to DCI format 1C, DCI format 3, DCI format 3A or any new DCI format.

In another method of D2D resource assignment signaling, the UE determines if a DCI detected is for cellular operation or D2D operation from the location of the detected DCI in the PDCCH/EPDCCH control region. For example, the whole PDCCH/EPDCCH search space can be partitioned into two parts, wherein if a DCI is detected in a first search space, the DCI is determined to be for cellular operation and if a DCI is detected in a second search space, the DCI is determined to be for D2D resource assignment.

In another method of D2D resource assignment signaling, the UE determines if a DCI detected is for cellular operation or D2D operation from the RNTI value used to pass the CRC checksum. For example, a new RNTI can be defined for decoding D2D resource allocation information in a PDCCH. If a DCI is detected with a first RNTI (e.g. C-RNTI), the DCI is determined to be for cellular operation and if a DCI is detected with a second RNTI (e.g. D2D Resource Assignment RNTI or D2DRA-RNTI), the DCI is determined to be for D2D resource assignment.

Figure 29:
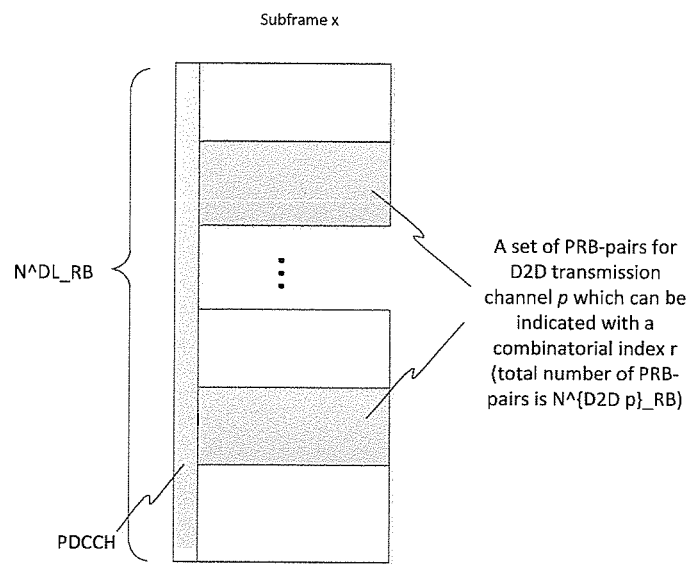
FIG. 29 illustrates an example of resource allocation signaling (Example 1-RA) according to this disclosure.

FIG. 29 illustrates an example of resource allocation signaling (Example 1-RA) according to this disclosure. The embodiment of the signaling shown in FIG. 29 is for illustration only. Other embodiments could be used without departing from the scope of the present disclosure.

One example of resource allocation signaling (Example 1-RA, FIG. 29) can be as follows. For a given serving cell, for each D2D transmission channel p, the UE capable of D2D transmission or reception is indicated by the network a combinatorial index r corresponding to the PRB index $$\{k_i\}_{i=0}^{N_{RB}^{D2D_p}}, (1 \le k_i \le N_{RB}^{DL}, k_i < k_{i+1})$$

and given by equation 1:

$$r = \sum_{i=0}^{N_{RB}^{D2D_p}-1} \binom{N_{RB}^{DL} - k_i}{N_{RB}^{D2D_p} - i} \quad (1)$$

as defined in section 7.2.1 of REF3, where $N_{RB}^{DL}$ is the number of PRB pairs associated with the downlink bandwidth, $N_{RB}^{D2D_p}$ is the number of PRB-pairs constituting D2D transmission channel P, and is configured by the higher layer, and $$\binom{x}{y} = \begin{cases} \binom{x}{y} & x \geq y \\ 0 & x < y \end{cases}$$

is the extended binomial coefficient, resulting in unique label $$r \in \left\{ 0, \ldots, \binom{N_{RB}^{DL}}{N_{RB}^{D2D_p}} - 1 \right\}.$$

Figure 30:
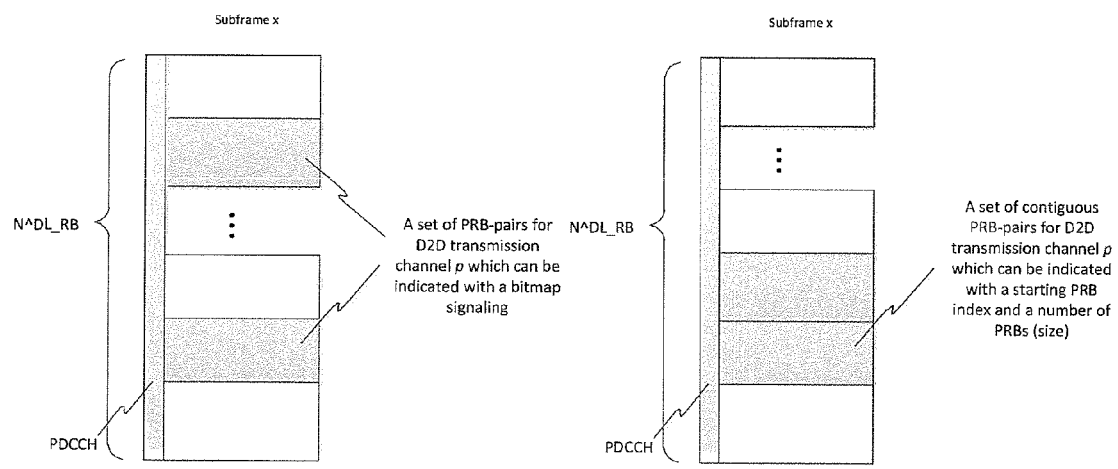
FIG. 30 illustrates examples of resource allocation signaling (left: Example 2-RA; right: Example 3-RA) according to this disclosure.

FIG. 30 illustrates examples of resource allocation signaling (left: Example 2-RA; right: Example 3-RA) according to this disclosure. The embodiment of the signaling shown in FIG. 30 is for illustration only. Other embodiments could be used without departing from the scope of the present disclosure.

Another example of resource allocation signaling (Example 2-RA, FIG. 30) includes PRB-pair-based bitmap signaling where each bit indicates whether a PRB-pair is allocated for a given D2D transmission channel. In another alternative of this example, each bit indicates a set of contiguous PRB-pairs of size K, where K is a constant integer (e.g. 2 or 3).

Another example of resource allocation signaling (Example 3-RA, FIG. 30) includes a couple of PRB-pair starting index and a number of PRBs, which indicates a block of contiguous PRB-pairs allocated to a D2D transmission channel. The above resource allocation signaling methods can be used to signal the resources in Table 9. They can also be used to directly indicate the D2D resource assigned to a UE in a DCI format or a higher layer message (i.e. instead of indicating an index in Table 9, the information bits are directly signaled to the UE).

In another alternative, resources such as a set of DL subframes or a set of physical resource blocks of a set of DL subframes can be indicated by the network to be reserved for D2D transmission. The UEs transmitting D2D signals can choose a subset of physical resource blocks for its D2D transmission from the reserved physical resource blocks by the network for D2D transmission. The UE transmitting D2D signals is responsible for signaling the resource allocation and other control information to the UE receiving D2D signals using a D2D control channel.

UE transmitting D2D signals can perform channel listening of a physical resource block before deciding to use a particular physical resource block in order to avoid collision. The detection signals used by the UE can be the D2D reference signals used for demodulation of the D2D data. Alternatively, the detection signals used by the UE can be a separate detection signal.

A potential advantage of this design is support of out-of-network-coverage scenarios, where direct transmission is still desired. In this case, a network or a UE can have preconfigured the time/frequency resources from which the UEs can select for the purpose of D2D transmission.

This embodiment has been described assuming DL subframes are used as D2D resource, e.g. in accordance with Embodiment P1. This embodiment is also applicable to the D2D framework using UL subframes as D2D resource, e.g. in accordance with Embodiment P1a, by replacing 'DL subframes' in the above paragraphs under this embodiment with 'UL subframes', replacing $N_{RB}^{DL}$ with $N_{RB}^{UL}$ which is the number of PRB pairs associated with the uplink bandwidth. PDCCH is also absent in FIG. 29 and FIG. 30 in this case.

Certain subset of subframes can be utilized for indicated D2D resource assignment. This may be advantageous in the case that the location and periodicity of D2D subframes are indicated via D2D SIB and resource allocation requests and grants need to only be indicated in proximity to the timing of the D2D subframes.

Figure 31:
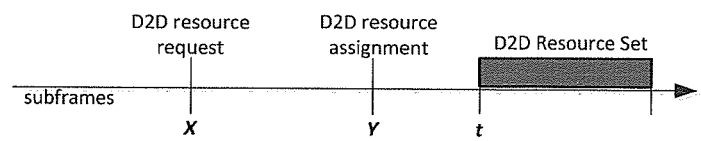
FIG. 31 illustrates an example of subframe indication for D2D resource request and assignment via offset according to this disclosure.

FIG. 31 illustrates an example of subframe indication for D2D resource request and assignment via offset according to this disclosure. The embodiment of the subframe indication shown in FIG. 31 is for illustration only. Other embodiments could be used without departing from the scope of the present disclosure.

In one alternative the subframes for sending D2D resource requests receiving D2D resource assignment can be defined as relative offsets X and Y respectively to the start of a given D2D subframe set at time t. For example as indicated in FIG. 31, resource allocation requests can be sent by UEs at subframe t-X and allocation grants received at subframe t-Y. The offset indicated by X or Y may correspond to a single subframe or can indicate a starting subframe where any subsequent subframe can be utilized for a D2D resource request or D2D resource assignment. Upon receiving a D2D resource assignment in at subframe t-Y, the D2D UE transmits D2D signals or data from or on subframe t. With this alternative, in an example procedure, the UE can interpret if a DCI received is for the purpose of D2D operation such as D2D resource assignment or for the purpose of normal cellular operation such as an UL grant. For example if D2D resource allocation DCI is based on DCI format 0, and if the UE receives a DCI format 0 in subframe t-Y, the UE interprets the DCI as a D2D resource allocation DCI; otherwise the UE interprets the DCI as a conventional UL grant. In another example of this alternative, in subframes containing D2D resource set, there is also conventional UL resource that does not overlap with the D2D resource, and the UE is required to examine if the resource allocation provided by the UL grant in subframe t-Y is located in a predefined or preconfigured D2D resource set in subframe t or not. If the resource allocation provided by the UL grant is located in the D2D resource set, then the UL grant is determined to be a D2D resource allocation message; otherwise, the UL grant is determined to be the conventional UL grant.

In a second alternative a set of subframes for sending D2D resource requests and for receiving D2D resource assignment can be defined explicitly (e.g., via bitmap). In one example, the subframe indices are provided to the UE. In a further alternative, the indices can be relative to the start of a given D2D subframe set at time t. In this case the offsets X and Y, can correspond to a set of multiple offsets.

In both of the above alternatives the indication of subframe offset or bitmap, the corresponding values can be indicated via D2D SIB or by RRC configuration message.

In a third alternative, the subframes for sending D2D resource requests receiving D2D resource assignment can be unrestricted and UEs can expect to send grants and receive resource assignments in any available uplink or downlink subframes.

In case a normal UL grant is received by a UE in a subframe where the corresponding PUSCH is determined to be transmitted in a known D2D resource, there is a need for the UE to determine how the UL grant or the scheduled PUSCH should be handled in order to avoid interference to D2D links. In a first approach, the UE can delay the corresponding PUSCH transmission to a next available UL subframe not reserved as D2D resource. This approach has an advantage that there are more DL subframes available for the network to schedule UL grant, as such the capacity of the control region of DL subframes can be more efficiently utilized. In a second approach, the UE discards the UL grant. This approach is simple and interference to the D2D links can still be avoided.

In one embodiment of this disclosure (hereinafter referred to as "Embodiment P3"), a transmission scheme using downlink demodulation reference signals (DM-RS, also sometimes called UE-specific reference signals (UE-RS) for PDSCH based on transmission mode 9 and 10 in LTE) can be used for D2D transmission. For the purpose of D2D broadcast or multicast or groupcast, the DMRS should be received by a group of UEs, hence the DMRS is actually a UE-group RS. Nevertheless, such RS is referenced as UE-RS with the understanding that it can be received by a group of UEs. In another option, transmission scheme using the MBSFN reference signals can be used for D2D transmission. The MBSFN RS can provide superior link level SINR than the demodulation signals due to the denser RS structure of the MBSFN RS. Alternatively, the overhead of MBSFN RS is larger than the DMRS. The reference signals used for D2D transmission are referenced as D2D reference signals (D2D RS). This embodiment is applicable based on the physical resource structure as described in Embodiment P1 or Embodiment P1A.

If demodulation reference signals are used for D2D transmission, the resource element mapping of D2D RS antenna ports can be the same as antenna port 7-14 defined for LIE (REF1).

The number of antenna ports that can be configured for D2D transmissions can be upper-bounded by M, a constant.

In one example, M=2. In one method (Method 1—D2D RS), the D2D RS Resource Element (RE) mapping is the same as UE-RS RE mapping for antenna ports 7 and 8, and a D2D transmitter can be configured with one (or two) antenna port out of antenna ports 7 and 8. In another method (Method 2—D2D RS), the D2D RS RE mapping is the same as UE-RS RE mapping for antenna ports 7 and 9, and a D2D transmitter can be configured with one (or two) antenna port out of antenna ports 7 and 9.

In another example, M=1, the D2D RS RE mapping is the same as UE-RS RE mapping for antenna port 7.

In another example (Method 3—D2D RS), M=4, the D2D RS RE mapping is the same as the UE-RS RE mapping for antenna ports 7-10.

In one example, the D2D transmission scheme using D2D reference signals is single layer transmission, i.e., no spatial multiplexing is applied. This is beneficial for D2D transmission in performed in a broadcast manner as the UE receiving the broadcast message may only be equipped with one receive antenna.

In one alternative of single layer transmission scheme for D2D transmission, the D2D data resource elements is only associated with one configured D2D RS port.

In another alternative of single layer transmission scheme for D2D transmission, the D2D data resource elements are associated with the M D2D RS ports, where the M antenna ports can be determined according to Method 1-D2D RS or Method 2-D2D RS or Method 3-D2D RS above. For example, when Method 1-D2D RS is used and denoting the two antenna ports as DMRS antenna ports 0 and 1 (which can correspond to 3GPP LTE antenna ports 7 and 8 respectively), the resource elements are associated with antenna ports 0 and 1 alternatingly in the increasing order of first in the frequency direction and then in the time direction, starting with the first slot and ending with the second slot in a subframe. Assuming D2D subframe is a DL subframe (e.g. Embodiment P1), FIG. 32 shows an example DMRS antenna port association with Resource Elements (REs) assigned for D2D transmission, where the DMRS REs are skipped when associating the antenna ports and the D2D REs, and the D2D REs start from the 3rd OFDM symbol in the subframe. Similarly, assuming D2D subframe is a UL subframe (e.g. Embodiment P1a), FIG. 33 shows an example DMRS antenna port association with REs assigned for D2D transmission, where the DMRS REs are skipped when associating the antenna ports and the D2D REs, and the D2D REs start from the 1st OFDM symbol in the subframe. The embodiments shown in FIGS. 32 and 33 are for illustration only. Other embodiments can be used without departing from the scope of the present disclosure.

Assume D2D subframe is a DL subframe (e.g. Embodiment P1). In one method, the starting OFDM symbol number for the physical D2D channel transmission (or mapping) is not configurable, and configured as a constant in the protocol. In one example, the starting OFDM symbol number is 1=2, or the 3rd OFDM symbol in the subframe. This example is motivated by the fact that in MBSFN subframes 2 OFDM symbols are configured for PDCCH transmissions.

Assume D2D subframe is a DL subframe (e.g. Embodiment P1). In another method, the starting OFDM number for the physical D2D channel transmission (or mapping) is configurable by the network, e.g., by UE-specific/cell-specific RRC signaling, or carried in an SIB and can indicate any OFDM symbol number including 1=0 (corresponding to the first OFDM symbol).

In yet another alternative of single layer transmission scheme for D2D transmission, the single layer transmission scheme can be configured. For example, the UE intending to transmit D2D signals can signal to the network its preferred transmission scheme which can be determined by its baseband or RF capability. The network can then configure the D2D transmission scheme accordingly to the receiver UEs receiving D2D signals from the transmitter UE.

For any of the D2D antenna ports, the reference-signal sequence r(m) can be defined by:

$$r(m) = \frac{1}{\sqrt{2}}(1 - 2 \cdot c(2m)) + j\frac{1}{\sqrt{2}}(1 - 2 \cdot c(2m+1)), \quad (2)$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix.} \end{cases}$$

where the pseudo-random sequence c(i) is defined in Section 7.2 of REF1. The pseudo-random sequence generator shall be initialized with $c_{init} = (\lfloor n_s/2 \rfloor + 1) \cdot (2n_{ID}^{(i)} + 1) \cdot 2^{16} + n_{SCID}$, at the start of each subframe, where $n_s$ is the slot number within a radio frame. The reference-signal sequence r(m) assumes D2D subframe is a DL subframe (e.g. Embodiment P1). If D2D subframe is a UL subframe (e.g. Embodiment P1a), the reference-signal sequence r(m) is the same except that $N_{RB}^{max,DL}$ (largest downlink bandwidth configuration, expressed in multiples of resource blocks) is replaced by $N_{RB}^{max,UL}$ (largest uplink bandwidth configuration, expressed in multiples of resource blocks).

In one option, the quantities $n_{ID}^{(i)}$, i=0, 1, are given by the physical layer cell identity ($N_{ID}^{cell}$). In another option, $n_{ID}^{(i)}$, i=0, 1 are given by higher layer signaling; this enables the same D2D port to be reused by different UEs performing D2D transmission without suffering from excessive interference provided that their D2D coverage do not overlap.

Similarly, $n_{SCID}$ for D2D RS can be fixed to a constant, e.g. 0 or 3 (to distinguish from UE-RS using nSCID=0, 1 and EPDCCH DMRS using nSCID=2), but for facilitating resource reuse, it is also beneficial to let $n_{SCID}$ be configurable by the network, e.g. using the control signaling that indicates the resources for a D2D transmission channel. In a special case, the signaling for indicating $n_{SCID}$ and $n_{ID}^{(i)}$ can be jointly performed and we obtain the following initialization of the pseudo-random sequence generator:

$$c_{init}=(\lfloor n_s/2 \rfloor+1)\cdot(2n_{ID}^{(nSCID)}+1)\cdot 2^{16}+n_{SCID} \quad (3)$$

Resource reuse can be also enabled if more than one port is defined for D2D transmission, where one port is used for one D2D transmission channel. In one example, orthogonal ports multiplexed with time-domain orthogonal cover can be used for D2D transmission, e.g. in the same way as port 7 and port 8 multiplexing. In another example, orthogonal ports multiplexed in frequency can be used for D2D transmission, e.g. in the same way as port 7 and port 9 multiplexing. Frequency multiplexing of D2D ports may be more resilient to timing/freq misalignment compared to time-domain code multiplexing.

In order to improve the channel estimation performance of the D2D RS, PRB bundling across subframes or across physical resource blocks can be configured by the UE. When PRB bundling is configured for a set of PRBs, a UE can assume that the same precoder has been applied to all the PRBs in the set of PRBs, for each antenna port. The PRB bundling can be configured by the network, or the bundling is mandated by the protocols without explicit configurations.

In one embodiment of this disclosure (hereinafter referred to as "Embodiment P4"), D2D data channel information bits can be scrambled prior to modulation to improve transmission reliability against interference and noise.

For each codeword q of D2D transmission channel, the block of bits $b^{(q)}(0), \ldots, b^{(q)}(M_{bit}^{(q)}-1)$, where $M_{bit}^{(q)}$ is the number of bits in codeword q transmitted on the physical channel in one subframe, is scrambled prior to modulation, resulting in a block of scrambled bits $\tilde{b}^{(q)}(0), \ldots, \tilde{b}^{(q)}(M_{bit}^{(q)}-1)$ according to $\tilde{b}^{(q)}(i)=(b^{(q)}(i)+c^{(q)}(i))\mod 2$, where the scrambling sequence $c^{(q)}(i)$ is given by Section 7.2 of REF1. The scrambling sequence generator is initialized at the start of each subframe, where the initialisation value of $c_{init}$ can be a function of the D2D transmission channel identity. In general, the initialization value of $c_{init}$ can also be a function of at least one or more of, but not limited to, the following parameters:

1. D2D transmission channel identity for channel p ($N_{ID}^{D2D,p}$)
2. the slot number within a radio frame ($n_s$)
3. D2D RNTI ($n_{D2D-RNTI}$)
4. Codeword index (q)
5. D2D resource pool configuration identity r ($N_{ID}^{D2D,r}$)
6. D2D groupcast identity g ($N_{ID}^{D2D,g}$)

Two example functions for $c_{init}$ are given below.

Example 1

$c_{init}=\lfloor n_s/2 \rfloor \cdot 2^9+N_{ID}^{D2D,p}$, where $N_{ID}^{D2D,p}$ is the D2D transmission channel identity and $n_s$ is the slot number within a radio frame.

Example 2

$c_{init}=n_{D2D-RNTI}\cdot 2^{14}+q\cdot 2^{13}+\lfloor n_s/2 \rfloor \cdot 2^9+N_{ID}^{D2D,p}$, where $n_{D2D-RNTI}$ is the D2D RNTI, $N_{ID}^{D2D,p}$ is the D2D transmission channel identity for channel p and $n_s$ is the slot number within a radio frame.

In order to allow UEs with only a single receiver antenna port to receive D2D signals, the number of codewords for a D2D transmission can be fixed to one (q=0).

In one method, the modulation format for the D2D transmission physical channel is not configurable by the network and is fixed to QPSK. This will help the broadcast transmission to be robust and is especially beneficial if the D2D transmission is a broadcast transmission and there is no HARQ-ACK and/or CSI feedback from the UE receiving the D2D signals for link adaptation purpose.

In another method, the modulation format can be configured by the network (for example, QPSK, 16QAM or 64QAM) for a given D2D transmission channel. The modulation format for a given D2D transmission channel can be signaled by the network, e.g. in SIB.

In one method the transmit power that is used by the UE performing direct transmission is configured by the network and is indicated to the UE by common (e.g. SIB) or dedicated (e.g. RRC) control signaling.

In another method the UE can autonomously select the transmit power for direct transmission from a range of values configured by the network which are indicated to the UE by common (e.g. SIB) or dedicated (e.g. RRC) control signaling.

In another method, the UE can autonomously select the transmit power for direct transmission based, for example, on the coverage area it wants provide, subject to the transmission power not exceeding a value that is predetermined or configured to the UE by a network through higher layer signaling.

In one embodiment of this disclosure (hereinafter referred to as "Embodiment P5"), a UE capable of D2D transmission should transmit the D2D signals using the timing and/or frequency that are synchronized with the serving cell.

For a UE receiving the D2D signals, in one alternative (alt 1), the UE can receive D2D signals using the same time and/or frequency as for receiving the signals from the serving cell, i.e. the D2D signal antenna ports may be assumed by the UE to be quasi co-located with the serving cell's signals on antenna ports such as CRS/PSS/SSS ports in terms of average delay, frequency shift (or, Doppler spread and Doppler shift).

In another alternative (alt 2), a UE cannot assume the D2D signals antenna port is quasi co-located with the serving cell's signals on antenna ports such as CRS/PSS/SSS ports, in terms of delay spread, Doppler spread, Doppler shift, average gain and average delay. In this case, the UE may derive the large scale channel properties for D2D signal synchronization and D2D signal demodulation from the D2D reference signals. In addition, as each D2D transmission channel is associated with different UE transmitting the D2D signals, the UE receiving D2D signals from multiple D2D transmission channels may not assume the D2D signals from different D2D transmission channels to be quasi co-located.

In yet another alternative, the quasi co-location assumption for receiving D2D signals can be configured to the UE receiving the D2D signals, e.g. whether the UE shall assume alt 1 or alt 2 can be configured. The network may not know the time and/or frequency synchronization capability of the UE transmitting D2D signals, therefore the quasi co-location configuration can be signaled or broadcast by the UE transmitting the D2D signals.

In order to further facilitate D2D signal synchronization, especially in the case where at least one of the UEs in out of network coverage, the transmitting UE may transmit a synchronization signal initially before transmitting the D2D data channel as well as periodically during the D2D transmission. Examples of synchronization signals include:

1. PSS/SSS
2. D2D detection signal
3. D2D reference signals
4. New synchronization or discovery signal
5. SRS
6. PRACH
7. Reference signals/synchronization signals based on Zadoff-Chu sequence Alternatively, a UE receiving D2D transmission may synchronize its reception using any of the above synchronization signals and the UE transmitting D2D transmission can commence broadcast transmissions without first transmitting only a synchronization signal.

The presence and location of the D2D synchronization signal can be indicated to the UEs receiving the D2D signals by broadcast or dedicated signaling (e.g. SIB or RRC) or be predetermined such as for example in case of D2D reference signals or D2D detection signals. The presence and location of the D2D synchronization signal also can be blindly detected by the UEs receiving the D2D signals. Blind detection can be useful if the UE is out of network coverage.

In one embodiment of this disclosure (hereinafter referred to as "Embodiment P6"), a UE capable of D2D transmission can transmit a D2D transmission control channel in addition to the RS and data symbols. This may be beneficial in order to allow more dynamic selection and adaptation of D2D transmission parameters and resources as well as support D2D operation when at least one of the transmitting or receiving UEs is out of network coverage. For example, the UE may wish to change its MCS and/or other control information based on the message type or feedback information from the receiving UEs if a network-assisted or direct D2D return channel is present. For example, the UE may wish to change a number of PRBs where it transmits the broadcast signaling.

In one method the D2D transmission control channel utilizes EPDCCH to provide the relevant control information necessary for reception of D2D transmissions including at least one of the following in a new DCI format (D2D DCI format):

1. MCS
2. The starting OFDM number for the physical D2D channel transmission
3. Time/frequency physical resources for D2D transmission (e.g. subframes, PRB mapping)
4. Power ratio of D2D data and D2D RS
5. Transmission priority (e.g. emergency alert message)
6. Transmission channel identity (e.g. $N_{ID}^{D2D,P}$)

7. Feedback mode (Further details are provided in Embodiment P7)

Note that if D2D subframe is a UL subframe (e.g. Embodiment P1a), then D2D EPDCCH can be located on UL subframe.

UE transmitting D2D signals can be configured a D2D EPDCCH PRB-pair set, where the example PRB-pair set size can be x PRB-pairs, where x can be a fixed constant or configurable (e.g. x=1 or 2). There can be one D2D EPDCCH unit with a new DCI format carrying the control information for one D2D transmission channel. The control channels for multiple D2D transmission channels transmitted by the same UE can be multiplexed as different EPDCCH units in the configured D2D EPDCCH PRB-pair set.

In one method ECCEs of the D2D EPDCCH can be multiplexed in the assigned PRBs for D2D transmission.

In one method the ECCE aggregation level of the aforementioned ECCEs is fixed and indicated to the UEs by higher layer signaling or preconfiguration. A receiving UE, knowing a location and a number of the ECCEs, can skip the respective resource elements for the reception of the broadcast signaling and perform an appropriate rate matching.

In one method, the D2D EPDCCH is not transmitted in every subframe but is instead transmitted in subframes either with a predetermined periodicity relative to a first subframe of a frame (consisting of ten subframes), as this is informed either by system information or is fixed in a system operation, or with a predetermined pattern that is informed to UEs by system information from a network.

The D2D DCI's CRC can be scrambled with a new RNTI value called D2D-RNTI that can be predefined in the standard specification and is known to the UEs.

The block of bits $b(0), \ldots, b(M_{bit}-1)$ to be transmitted on an D2D EPDCCH in a subframe shall be scrambled, resulting in a block of scrambled bits $\tilde{b}(0), \ldots, \tilde{b}(M_{bit}-1)$ according to $$\tilde{b}(i)=(b(i)+c(i)) \bmod 2 \qquad (4)$$

where the scrambling sequence c(i) is given by Section 7.2 of 36.211. The scrambling sequence generator shall be initialized with $c_{init}=\lfloor n_s/2 \rfloor \cdot 2^9 + n_{ID}^{D2D-EPDCCH}$. In one example, $n_{ID}^{D2D-EPDCCH}$ can be the same as $N_{ID}^{D2D,P}$. In another example, $n_{ID}^{D2D-EPDCCH}$ can be a separate D2D EPDCCH identity, configured by the network and signaled e.g. in SIB.

In another method of D2D control channel transmission, the network can transmit the D2D EPDCCHs. In such a case, the D2D EPDCCHs for multiple UEs transmitting D2D signals can be multiplexed in the same D2D EPDCCH PRB set.

In one embodiment of this disclosure (hereafter referred to as Embodiment P7), in order to facilitate link adaptation for the D2D transmitting UE, such as transmit power and MCS selection, feedback from UEs attempting to receive the D2D transmissions can be beneficial. As a result, a network may optionally support a D2D feedback channel.

In one method (Method 1), the receiving UEs can be configured by a network to measure a link quality of a D2D transmission on certain physical resources such as a D2D RS. The presence and configuration of the feedback channel can be given by higher layer signaling or be directly indicated to receiving UEs in a D2D control channel information. If configured, a UE then can report a measurement, for example in the form of RSRP, to the network or to the transmitting UE (if it includes an UL receiver) in a D2D feedback channel for which a respective UL resource is also configured by the network or indicated in the D2D control channel information. If receiving D2D UEs report respective measurements to a network, the network can subsequently inform these measurements to the D2D transmitting UE by higher layer signaling. This higher layer signaling can include either a predetermined number of measurements, such as Q measurements with the lower value (including zeros if the total number of measurements is less than Q), or include only the measurement with the lowest value, and so on. Therefore, a D2D receiving UE can be configured with multiple Reference Signal Received Power (RSRP) measurements (or any other measurement of similar type); one corresponding to a signal transmitted by the network, another corresponding to a signal transmitted from a first D2D UE, and so on.

In another method (Method 2), receiving UEs can be configured to feedback an acknowledgement message per D2D transmission channel. The UE can transmit a signal conveying a single bit (or 2 bits in case of Multiple-Input-Multiple-Output (MIMO) D2D transmission) indicating a correct or incorrect reception of a D2D channel. A resource used for a UE to transmit the acknowledgement message can be configured to the UE by higher layer signaling.

In another method (Method 3), receiving UEs can be configured to feedback a Negative Acknowledgement (NACK) message per D2D transmission channel. If a UE interested in receiving a D2D transmission on a given channel is unable to correctly decode the transmission, the UE can transmit a signal indicating the reception failure. Otherwise, if a UE correctly decodes the transmission, the UE does not transmit a signal. A same resource can be used for all UEs and a network, or the transmitting UE if it is equipped with an UL receiver, can detect a total received energy in the resource and estimate a number of UEs that failed to correctly detect the transmission channel. In case this estimation occurs at a network, the network can then inform the transmitting UE of the detected energy so that the transmitting UE can perform an appropriate link adaptation (transmission power or MCS) for the transmission channel or this adaptation can be determined by the network and informed to the transmitting UE by higher layer signaling.

In one alternative of Method 1, the feedback information for all D2D transmission channels a receiving UE is currently configured to provide feedback on are provided in a single message. For example, in the case of Method 1, a single message consisting of multiple fields, with each field corresponding to a measurement for a different D2D transmission channel, can be configured for the receiving UE to report. For example, in the case of Method 2, a single bitmap, with each bit corresponding an Acknowledgement (ACK) or Negative Acknowledgement (NACK) value for a different D2D transmission channel, can be configured for the receiving UE to report.

In another alternative the feedback information for the D2D transmission channels are provided in separate messages for each channel a receiving UE is currently configured to provide feedback on. This may be beneficial in the case the different D2D transmission channels are not aligned in their transmission timing and aggregation of the feedback may introduce unacceptable delays. Also, aggregation is not beneficial if the feedback of a given D2D transmission channel is configured to be received directly by the transmitting UEs instead of the network.

The network or transmitting UE can utilize the feedback to determine if the current transmission parameters are sufficient to provide the level of QoS desired. For example the network may utilize and RSRP threshold or NACK count to determine whether to send a reconfiguration (SIB or RRC) of the MCS and transmit power for the corresponding D2D transmission channels.

None of the description in this application should be read as implying that any particular element, step, or function is an essential element that must be included in the claim scope: the scope of patented subject matter is defined only by the claims. Moreover, none of these claims is intended to invoke paragraph six of 35 USC §112 unless the exact words "means for" are followed by a participle.

Although various features have been shown in the figures and described above, various changes may be made to the figures. For example, the size, shape, arrangement, and layout of components shown in FIGS. 1-9 and 17A-24 and 26, 27 and 29-33 are for illustration only. Each component could have any suitable size, shape, and dimensions, and multiple components could have any suitable arrangement and layout. Also, various components in FIGS. 1-9 and 17A-24 and 26, 27 and 29-33 could be combined, further subdivided, or omitted and additional components could be added according to particular needs. Further, each component in a device or system could be implemented using any suitable structure(s) for performing the described function(s). In addition, while FIGS. 10-16, 25 and 28 illustrate various series of steps or signals, various steps or signals in FIGS. 10-16, 25 and 28 could overlap, occur in parallel, occur multiple times, or occur in a different order.

It can be also contemplated that various combinations or sub-combinations of the specific features and aspects of the embodiments may be made and still fall within the scope of the appended claims. For example, in some embodiments, the features, configurations, or other details disclosed or incorporated by reference herein with respect to some of the embodiments are combinable with other features, configurations, or details disclosed herein with respect to other embodiments to form new embodiments not explicitly, disclosed herein. All of such embodiments having combinations of features and configurations are contemplated as being part of the present disclosure. Additionally, unless otherwise stated, no features or details of any of the embodiments disclosed herein are meant to be required or essential to any of the embodiments disclosed herein, unless explicitly described herein as being required or essential.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A method, comprising:
configuring one or more pools of Device-to-Device (D2D) communication resources by an eNodeB (eNB);
signaling information regarding the one or more configured pools of D2D communication resources by the eNB to a first User Equipment (UE) and a plurality of UEs using a common broadcast channel;
receiving a request for one or multiple D2D communication resources by the eNB from the first UE, wherein the first UE is configured to transmit D2D messages;
determining one or multiple resources for D2D communication by the eNB for the first UE; and
communicating a D2D resource allocation information to the first UE, wherein the first UE communicates the D2D resource allocation information to one or more of the plurality of UEs and transmits D2D data to one or more of the plurality of UEs when the D2D resource allocation information is received from the eNB, wherein a format for communicating the D2D resource allocation information includes an indication of time/frequency physical resources for D2D data transmission and an identification of transmission channel identity for D2D control channel transmission, and wherein, when the first UE is within a network coverage, D2D signals are transmitted using at least one of timing and frequency of a serving cell's uplink transmission, wherein the first UE is configured to function as a relay for D2D synchronization transmission, configuration transmission, D2D control channel transmission and reception, and D2D data channel transmission and reception with one of the plurality of UEs that is not within the network coverage.

2. The method of claim 1, further comprising:

receiving a request for one or more D2D communication resources from the first EE using one of: a random access procedure, or a scheduling request message, or a higher layer message, wherein for random access procedure, D2D resource request information is received in a Message 3 of the random access procedure, wherein the D2D resource request information includes a priority of request, an amount of resources required, and a required length of resource reservation period.

3. The method of claim 1, wherein communicating the D2D resource allocation information comprises using a higher layer message or a layer 1 control signaling, wherein the format is a Downlink Control information (DCI) format, wherein the layer 1 control signaling is carried by a Physical Downlink Control Channel (PDCCH) with the DCI format, and wherein the DCI format is DCI format 0.

4. The method of claim 3, further comprising:

identifying whether the DCI format is for a conventional purpose or for D2D resource allocation, wherein the DCI format for D2D resource allocation is further identified using predetermined values for a set of parameters in the DC format, wherein a parameter of the set of parameters is at least one of: a modulation and coding scheme and redundancy version, wherein a parameter of the set of parameters is a number of physical resource blocks indicated by a resource block assignment and hopping resource allocation field.

5. The method of claim 1, wherein the first UE communicates D2D resource allocation information corresponding to the D2D data to be transmitted to the one or more of the plurality of UEs using a D2D control channel before transmitting D2D data, wherein the D2D control channel includes at least one of modulation and coding scheme information, time and frequency physical resources for D2D transmission, and a transmission channel identity.

6. The method of claim 1, wherein for the first UE, D2D signals and conventional UL signals are transmitted in a time-division multiplexing manner.

7. The method of claim 1, further comprising:

determining D2D transmit timing, wherein one or more synchronization signals are transmitted by the first UE if the first UE is out of network coverage, and wherein the one or more synchronization signals comprise one of Primary Synchronization Signals, Secondary Synchronization Signals, or a Zadoff Chu sequence.

8. A method comprising:

configuring one or more pools of device-to-device (D2D) communication resources by an enhanced Node B (eNB); and signaling, by the eNB, the configured one or more pools of D2D communication resources to a first user equipment (UE) and a plurality of UEs using a common broadcast channel, wherein in response to the signaling of the configured one or more pools of D2D communication resources, the first UE:

chooses from the one or more pools of D2D communication resource, one or more D2D resources for D2D transmissions;

communicates D2D resource allocation information to at least one UE of the plurality of UEs; and transmits D2D data to the at least one UE of the plurality of UEs when the D2D resource allocation information is received from the eNB, wherein a format for communicating the D2D resource allocation information includes an indication of time/frequency physical resources for D2D data transmission and an identification of transmission channel identity for D2D control channel transmission, and wherein, when the first UE is within a network coverage, the D2D data is transmitted using at least one of timing and frequency of a serving cell's uplink transmission, wherein the first UE is configured to function as a relay for D2D synchronization transmission, configuration transmission, D2D control channel transmission and reception, and D2D data channel transmission and reception with one of the plurality of UEs that is not within the network coverage.

9. The method of claim 8, wherein the first UE can perform channel listening before choosing a resource for D2D transmission.

10. The method of claim 8, wherein the first UE communicates D2D resource allocation information corresponding to the D2D data to be transmitted to the at least one UE of the plurality of UEs using a D2D control channel before transmitting the D2D data, and wherein the D2D resource allocation information includes at least one of modulation and coding scheme information, time and frequency physical resources for D2D transmission, and a transmission channel identity.

11. The method of claim 8, wherein for the first UE, D2D signals and conventional UL signals are transmitted in a time-division multiplexing manner, the D2D signals comprising the D2D data.

12. The method of claim 11, further comprising:

determining D2D transmit timing, wherein the D2D signals comprise the D2D data, wherein one or more synchronization signals are transmitted by the first UE if the first UE is out of network coverage, and wherein the one or more synchronization signals comprise one of Primary Synchronization Signals, Secondary Synchronization Signals, and a Zadoff Chu sequence.

13. A user equipment (UE) configured for D2D communication, the UE comprising:
a processing circuitry configured to:
receive configuration of one or more pools of device-to-device (D2D) communication resources by an enhanced Node B (eNB) through a common broadcast channel;
send a request for one or more D2D communication resources to the eNB;
receive D2D resource allocation information from the eNB;
communicate D2D resource allocation information to one or more UEs; and
transmit D2D data to the one or more UEs when the D2D resource allocation information is received from the eNB,
wherein a format for communicating the D2D resource allocation information includes an indication of time/frequency physical resources for D2D data transmission and an identification of transmission channel identity for D2D control channel transmission, and
wherein, when the UE is within a network coverage, D2D signals are transmitted using at least one of timing and frequency of a serving cell's uplink transmission,
wherein a first UE of the one or more UEs functions as a relay for D2D synchronization transmission, configuration transmission, D2D control channel transmission and reception, and D2D data channel transmission and reception with another of the one or more UEs that is not within the network coverage.

14. The UE of claim 13, wherein a request for one or multiple D2D communication resources is sent using one of: a random access procedure, or a scheduling request message, or a higher layer message,
wherein for random access procedure, D2D resource request information is transmitted in a Message 3 of the random access procedure,
wherein the D2D resource request information includes a priority of request, an amount of resources required, and a required length of resource reservation period.

15. The UE of claim 13, wherein D2D resource allocation information is received using a higher layer message or a layer 1 control signaling,
wherein the format is a Downlink Control Information (DCI) format,
wherein the layer 1 control signaling is carried by a Physical Downlink Control Channel (PDCCH) with the DCI format, and
wherein the DCI format is DCI format 0.

16. The UE of claim 15, wherein the DCI format for D2D resource allocation is further identified using predetermined values for a set of parameters in the DCI format,
wherein a parameter of the set of parameters is one of a modulation and coding scheme and redundancy version,
wherein a parameter of the set of parameters is a number of physical resource blocks indicated by a resource block assignment and hopping resource allocation field.

17. The UE of claim 13, wherein the processing circuitry further is configured to:
communicate D2D resource allocation information corresponding to the D2D data to be transmitted to the one or more UEs using a D2D control channel before transmitting D2D data,
wherein the D2D resource allocation information includes at least one of
modulation and coding scheme information,
time and frequency physical resources for D2D transmission, and
a transmission channel identity.

18. The UE of claim 13, wherein D2D signals and conventional UL signals are transmitted in a time-division multiplexing manner, the D2D signals comprising the D2D data.

19. A user equipment (UE) configured for D2D communication, the UE comprising:
a processing circuitry configured to:
receive configuration of one or more pools of D2D communication resources by an enhanced Node B (eNB) through a common broadcast channel;
choose from the one or more pools of D2D communication resource, one or more D2D resources for D2D transmissions;
communicate D2D resource allocation information to one or more UEs; and
transmit D2D data to the one or more UEs when the D2D resource allocation information is received from the eNB,
wherein a format for communicating the D2D resource allocation information includes an indication of time/frequency physical resources for D2D data transmission and an identification of transmission channel identity for D2D control channel transmission, and
wherein, when the UE is within a network coverage, the D2D data is transmitted using at least one of timing and frequency of a serving cell's uplink transmission,
wherein a first UE of the one or more UEs to functions as a relay for D2D synchronization transmission, configuration transmission, D2D control channel transmission and reception, and D2D data channel transmission and reception with another of the one or more UEs that is not within the network coverage.

20. The UE of claim 19, wherein the UE performs channel listening before choosing a resource for D2D transmission.

21. The UE of claim 19, wherein the processing circuitry further is configured to:
communicate D2D resource allocation information corresponding to the D2D data to be transmitted to the one or more UEs using a D2D control channel before transmitting D2D data,
wherein the D2D resource allocation information includes at least one of modulation and coding scheme information, time and frequency physical resources for D2D transmission and a transmission channel identity.

22. The UE of claim 19, wherein D2D signals and conventional UL signals are transmitted in a time-division multiplexing manner, the D2D signals comprising the D2D data.

23. An enhanced Node B (eNodeB), comprising:
a processing circuitry configured to:
configure one or more pools of Device-to-Device (D2D) communication resources;
signal information regarding the configured one or more pools of D2D communication resources to a first User Equipment (UE) and a plurality of UEs using a common broadcast channel;
receive a request for one or more D2D communication resources by the first UE configured to transmit D2D messages;

determine one or multiple resources for D2D communication for the first UE;

communicate D2D resource allocation information to the first UE, wherein the first UE transmits D2D data to one or more of the plurality of UEs using the D2D resource allocation information when the D2D resource allocation information is received from the eNB, wherein a format for communicating the D2D resource allocation information includes an indication of time/frequency physical resources for D2D data transmission and an identification of transmission channel identity for D2D control channel transmission, wherein, when the first UE is within a network coverage, D2D signals are transmitted using at least one of timing and frequency of a serving cell's uplink transmission, and wherein the first UE is configured to function as a relay for D2D synchronization transmission, configuration transmission, D2D control channel transmission and reception, and D2D data channel transmission and reception with another of the plurality of UEs that is not within the network coverage.

24. The eNB of claim 23, wherein a request for the one or more D2D communication resources is received using one of; a random access procedure, or a scheduling request message, or a higher layer message, wherein for random access procedure, D2D resource request information is received in a Message 3 of the random access procedure, wherein the D2D resource request information includes a priority of request, an amount of resources required, and a required length of resource reservation period.

25. The eNB of claim 23, wherein D2D resource allocation information is transmitted to the first UE using one of: a higher layer message or a layer 1 control signaling, wherein the format is a Downlink Control Information (DCI) format, wherein the layer 1 control signaling is carried by a Physical Downlink Control Channel (PDCCH) with the DCI format, and wherein the DCI format is DCI format 0.

* * * * *